United States Patent
Dunbar

(10) Patent No.: US 11,711,242 B2
(45) Date of Patent: Jul. 25, 2023

(54) SECURE SD-WAN PORT INFORMATION DISTRIBUTION

(71) Applicant: Huawei Technologies Co., Ltd., Shenzhen (CN)

(72) Inventor: Linda Dunbar, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 163 days.

(21) Appl. No.: 17/234,504

(22) Filed: Apr. 19, 2021

(65) Prior Publication Data

US 2021/0243053 A1    Aug. 5, 2021

Related U.S. Application Data

(63) Continuation of application No. PCT/US2019/056960, filed on Oct. 18, 2019.
(Continued)

(51) Int. Cl.
*H04L 12/46* (2006.01)
*H04L 45/02* (2022.01)
(Continued)

(52) U.S. Cl.
CPC ...... *H04L 12/4675* (2013.01); *H04L 12/4633* (2013.01); *H04L 45/02* (2013.01);
(Continued)

(58) Field of Classification Search
CPC ............. H04L 12/4641; H04L 12/4675; H04L 12/4679; H04L 45/00; H04L 45/02;
(Continued)

(56) References Cited

U.S. PATENT DOCUMENTS 7,373,660 B1    5/2008    Guichard et al.
10,594,592 B1 *  3/2020   Wang .................. H04L 45/04
(Continued)

FOREIGN PATENT DOCUMENTS

CN    101617305 A    12/2009
CN    101636724 A    1/2010
(Continued)

OTHER PUBLICATIONS

Verizon UK Ltd, "Clauses 1-9 of Connection Based Virtual Services," NFVEVE(18)000109, XP014323195, Retrieved from the Internet URL:docbox.etsi.org/ISG/NFV/EVE/05-CONTRIBUTIONS/2018/NFVEVE(18)000109r1_Clauses_1-9_of_Connection_Based_Virtual_Services.docx, Aug. 15, 2018, 48 pages.
(Continued)

*Primary Examiner* — Warner Wong
(74) *Attorney, Agent, or Firm* — Conley Rose, P.C.

(57) ABSTRACT

A Software Defined Wide Area Network (SD-WAN) edge node is disclosed. The SD-WAN edge node includes edge node SD-WAN ports coupled to untrusted underlay networks. The SD-WAN edge node transmits a first Border Gateway Protocol (BGP) update message advertising WAN (Wide Area Network) properties of the edge node SD-WAN ports to a local controller via an encrypted channel over the untrusted underlay network. The SD-WAN edge node receives a second BGP update message from the local controller, the second BGP update message advertising WAN properties of peer node SD-WAN ports of a peer node. The SD-WAN edge node establishes a security association with the peer node over the untrusted underlay networks based on the WAN properties of the edge node SD-WAN ports and the WAN properties of the peer node SD-WAN ports.

20 Claims, 11 Drawing Sheets

Related U.S. Application Data

(60) Provisional application No. 62/748,146, filed on Oct. 19, 2018.

(51) Int. Cl.
*H04L 45/64* (2022.01)
*H04L 9/40* (2022.01)
*H04L 69/326* (2022.01)

(52) U.S. Cl.
CPC .......... *H04L 45/64* (2013.01); *H04L 63/0428* (2013.01); *H04L 69/326* (2013.01); *H04L 63/0209* (2013.01)

(58) Field of Classification Search
CPC ..... H04L 69/322; H04L 69/326; H04L 63/04; H04L 63/0428; H04L 63/0485; H04L 12/46; H04L 12/4633; H04L 45/64; H04L 63/00; H04L 63/0209; H04L 63/16; H04L 63/20; H04L 63/205; H04L 9/00; H04L 9/12; H04L 9/40; H04L 65/102; H04L 65/1013; H04L 2012/5618; H04L 2209/00; H04L 2643/00
See application file for complete search history.

(56) References Cited

U.S. PATENT DOCUMENTS

| | | | |
|---|---|---|---|
| 11,196,591 B2 * | 12/2021 | Hira | ........................ H04L 12/66 |
| 2008/0170573 A1 | 7/2008 | Ould-Brahim | |
| 2008/0170578 A1 | 7/2008 | Ould-Brahim | |
| 2014/0086253 A1 | 3/2014 | Yong | |
| 2016/0380823 A1 | 12/2016 | Shen et al. | |
| 2017/0012895 A1 | 1/2017 | Zhao et al. | |
| 2018/0091481 A1 | 3/2018 | Mehta et al. | |
| 2018/0109450 A1 | 4/2018 | Filsfils et al. | |
| 2018/0219838 A1 * | 8/2018 | Eldridge | .............. G06F 11/3409 |
| 2019/0052558 A1 * | 2/2019 | Mehta | ...................... H04L 45/64 |
| 2021/0006490 A1 * | 1/2021 | Michael | .............. H04L 43/0864 |

FOREIGN PATENT DOCUMENTS

| | | |
|---|---|---|
| CN | 107637031 A | 1/2018 |
| EP | 2933958 A1 | 10/2015 |
| EP | 3300319 A1 | 3/2018 |
| WO | 2017015667 A1 | 1/2017 |

OTHER PUBLICATIONS

Dunbar, L., et al., "Gap Analysis of Interconnecting Underlay with cloud Overlay," draft-dm-net2cloud-gap-analysis-01. Aug. 6, 2018, 14 pages.

De Clercq, J., et al., "BGP-MPLS VPN extension for IPv6 VPN," draft-ietf-ppvpn-bgp-ipv6-vpn-03, Nov. 2002, 14 pages.

Dunbar, L., et al., "Gap Analysis of Dynamic Networks to Hybrid Cloud DCs," draft-ietf-rtgwg-net2cloud-gap-analysis-02, Jun. 19, 2019, 18 pages.

DGR/NGP-006.,"Next Generation Protocols (NGP); Intelligence-Defined Network (IDN)", ETSI GR NGP 006 V1.1.1, Jun. 2018, 35 pages.

* cited by examiner

SECURE SD-WAN PORT INFORMATION DISTRIBUTION

CROSS-REFERENCE TO RELATED APPLICATIONS

This patent application is a continuation of International Application No. PCT/US2019/056960, filed Oct. 18, 2019 by Linda Dunbar and titled "Secure SD-WAN Port Information Distribution,", which claims the benefit of U.S. Provisional Patent Application No. 62/748,146, filed Oct. 19, 2018 by Linda Dunbar, and titled "Overlay Tunnel Attributes Distribution In Large Scale Overlay Networks," which are hereby incorporated by reference.

TECHNICAL FIELD

The present disclosure is generally related to telecommunication networks, and is specifically related to secure distribution of software defined wide area network (SD-WAN) port information over unsecure public networks to support establishment of secure connections.

BACKGROUND

Modern networks allow devices to communicate over multiple interfaces. For example, a network device may be connected to both secure networks and uncontrolled pubic networks, such as the Internet. Network policies may require that different communications be treated differently. For example, some communications may be sent over the public Internet, other communications may only be sent over secure networks, and still other communications may be steered around certain geographic areas (e.g., communications barred from traversing country boundaries, etc.) Accordingly, complex routing schemes may be required to comply with network policies in some scenarios. To further complicate matters, modern network design may allow network tasks to be dynamically shifted between regions based on changing user behavior. For example, some software platforms may dynamically move processing tasks between data centers in order to perform such processing tasks in locations that are physically near to users in order to decrease latency. As user locations may shift around the globe based on time of day and user habits may change daily, the network topology for such systems may change significantly in ways that are difficult to predict. As such, static routing mechanisms set up by a human network administrator may be insufficient to implement complex routing schemes for dynamic network topologies.

SUMMARY

In an embodiment, the disclosure includes a Software Defined Wide Area Network (SD-WAN) edge node comprising one or more edge node SD-WAN ports configured to couple to one or more untrusted underlay networks and one or more trusted underlay networks; a transmitter; a receiver; a non-transitory memory comprising computer executable instructions; and a processor coupled to the transmitter, the receiver, and the memory, wherein the computer executable instructions, when executed by the processor, cause the SD-WAN edge node to: transmit a first Border Gateway Protocol (BGP) update message advertising wide area network (WAN) properties of the edge node SD-WAN ports to a local controller via an encrypted channel over the untrusted underlay networks; receive a second BGP update message from the local controller, the second BGP update message advertising WAN properties of peer node SD-WAN ports of a peer node; and establish a security association with the peer node or the peer node SD-WAN ports of the peer node over the untrusted underlay networks based on the WAN properties of the edge node SD-WAN ports and the WAN properties of the peer node SD-WAN ports. In some SD-WAN based systems, a local controller that retains SD-WAN data for related peer nodes. The SD-WAN data may include private addresses, public addresses, and mappings. Various protocols are used to send the SD-WAN data to relevant nodes when a connection is requested. This approach tends to over-tax the local controller when the local controller manages many peer nodes (e.g., 100). Hence, this approach is not scalable. BGP may be used in various network applications to exchange public sub-net data between nodes. The disclosed SD-WAN system overcomes the scalability problems described above by employing BGP to work with SD-WAN. The disclosed SD-WAN system uses BGP to exchange WAN port data between peers via the local controller. This offloads related processing to the peers to increase scalability. Further, disclosed SD-WAN system extends BGP to include WAN port properties (e.g., including secure information), and not public sub-net information.

Optionally, in any of the preceding aspects, another implementation of the aspect provides, wherein the WAN properties of the edge node SD-WAN ports describes SD-WAN port capabilities and tunnel end-point attributes, and wherein the WAN properties of the edge node SD-WAN ports are encoded in a Network Layer Reachability Information (NLRI) field of the first BGP update message.

Optionally, in any of the preceding aspects, another implementation of the aspect provides, wherein the WAN properties of the edge node SD-WAN ports comprises a tunnel end point, a private port address, a port internet protocol security (IPsec) capability, a SD-WAN routing policy, tunnel encryption data, or combinations thereof. Some BGP applications only advertise public sub-net address data, and hence such applications do not allow BGP to include security data or port specific information. The disclosed SD-WAN system extends BGP to allow for such secure data to be communicated.

Optionally, in any of the preceding aspects, another implementation of the aspect provides, wherein the WAN properties of the edge node SD-WAN ports is included in an overlay Subsequent Address Family Identifier (SAFI) specific overlay networks. Some systems employ an internet protocol (IP) SAFI to describe sub-net data. The disclosed embodiments employ an overlay SAFI (e.g., a SD-WAN SAFI) that is a different address family for describing port properties related to an overlay network, such as SD-WAN.

Optionally, in any of the preceding aspects, another implementation of the aspect provides, wherein the overlay SAFI contains a NLRI length, a SD-WAN type, a port distinguisher, a SD-WAN site identifier (ID), and a SD-WAN node ID.

Optionally, in any of the preceding aspects, another implementation of the aspect provides, wherein the WAN properties of the edge node SD-WAN ports are included in a SD-WAN tunnel encapsulation attribute. The disclosed example embodiment can be used with the overlay address family or an IP address family. If an IP SAFI is used, a BGP update message can be sent for each SD-WAN port. The local controller determines the data is for a SD-WAN port based on the presence of the SD-WAN tunnel encapsulation attribute describing IPsec.

Optionally, in any of the preceding aspects, another implementation of the aspect provides, wherein the SD-WAN tunnel encapsulation attribute includes a tunnel type, an IPsec security association (SA) attribute, and an encapsulation extension type length value (TLV).

In an embodiment, the disclosure includes local controller comprising a transceiver; a non-transitory memory comprising computer executable instructions; a processor coupled to the transceiver and the non-transitory memory, wherein the computer executable instructions, when executed by the processor cause the local controller to: receive a first Border Gateway Protocol (BGP) update message advertising first wide area network (WAN) properties of first peer node Software Defined Wide Area Network (SD-WAN) ports of a first peer node via a first encrypted channel over one or more untrusted underlay networks, the first BGP update message received via the transceiver; receive a second BGP update message advertising second wide area network (WAN) properties of second peer node SD-WAN ports of a second peer node via a second encrypted channel over the untrusted underlay networks, the second BGP update message received via the transceiver; forward the first BGP update message to the second peer node via the transceiver; and forward the second BGP update message to the first peer node via the transceiver to support establishment of a security association between the first peer node SD-WAN ports and the second peer node SD-WAN ports based on the first WAN properties and the second WAN properties.

In some SD-WAN based systems, a local controller that retains SD-WAN data for related peer nodes. The SD-WAN data may include private addresses, public addresses, and mappings. Various protocols are used to send the SD-WAN data to relevant nodes when a connection is requested. This approach tends to over-tax the local controller when the local controller manages many peer nodes (e.g., 100). Hence, this approach is not scalable. BGP may be used in various network applications to exchange public sub-net data between nodes. The disclosed SD-WAN system overcomes the scalability problems described above by employing BGP to work with SD-WAN. The disclosed SD-WAN system uses BGP to exchange WAN port data between peers via the local controller. This offloads related processing to the peers to increase scalability. Further, disclosed SD-WAN system extends BGP to include WAN port properties (e.g., including secure information), and not public sub-net information.

Optionally, in any of the preceding aspects, another implementation of the aspect provides, wherein the first WAN properties describes SD-WAN port capabilities and tunnel end-point attributes of the first peer node SD-WAN ports, and wherein the WAN properties of the edge node SD-WAN ports are encoded in a Network Layer Reachability Information (NLRI) field of the first BGP update message.

Optionally, in any of the preceding aspects, another implementation of the aspect provides, wherein the first WAN properties comprises a tunnel end point, a private port address, a port internet protocol security (IPsec) capability, a SD-WAN routing policy, tunnel encryption data, or combinations thereof. Some BGP applications only advertise public sub-net address data, and hence such applications do not allow BGP to include security data or port specific information. The disclosed SD-WAN system extends BGP to allow for such secure data to be communicated.

Optionally, in any of the preceding aspects, another implementation of the aspect provides, wherein the first WAN properties are included in an overlay Subsequent Address Family Identifier (SAFI) specific to overlay networks. Some systems employ an internet protocol (IP) SAFI to describe sub-net data. The disclosed embodiments employ an overlay SAFI (e.g., a SD-WAN SAFI) that is a different address family for describing port properties related to an overlay network, such as SD-WAN.

Optionally, in any of the preceding aspects, another implementation of the aspect provides, wherein the overlay SAFI contains a NLRI length, a SD-WAN type, a port distinguisher, a SD-WAN site identifier (ID), and a SD-WAN node ID.

Optionally, in any of the preceding aspects, another implementation of the aspect provides, wherein the first WAN properties are included in a SD-WAN tunnel encapsulation attribute. The disclosed example embodiment can be used with the overlay address family or an IP address family. If an IP SAFI is used, a BGP update message can be sent for each SD-WAN port. The local controller determines the data is for a SD-WAN port based on the presence of the SD-WAN tunnel encapsulation attribute describing IPsec.

Optionally, in any of the preceding aspects, another implementation of the aspect provides, wherein the SD-WAN tunnel encapsulation attribute includes a tunnel type, an IPsec security association (SA) attribute, and an encapsulation extension type length value (TLV).

In an embodiment, the disclosure includes a method implemented in a Software Defined Wide Area Network (SD-WAN) edge node, the method comprising advertising, by the SD-WAN edge node, SD-WAN port properties via a secure channel with a Border Gateway Protocol (BGP) route reflector, wherein SD-WAN ports are connected to private networks and public untrusted networks, and wherein the SD-WAN port properties are advertised via a BGP update message Network Layer Reachability Information (NLRI) field; receiving, by the SD-WAN edge node, SD-WAN port properties of a peer node from the BGP route reflector based on peer group policies; and establishing, by the SD-WAN edge node, a secure pairwise channel with the peer node based on the SD-WAN port properties of the SD-WAN edge node and the SD-WAN port properties of the peer node. In some SD-WAN based systems, a local controller that retains SD-WAN data for related peer nodes. The SD-WAN data may include private addresses, public addresses, and mappings. Various protocols are used to send the SD-WAN data to relevant nodes when a connection is requested. This approach tends to over-tax the local controller when the local controller manages many peer nodes (e.g., 100). Hence, this approach is not scalable. BGP may be used in various network applications to exchange public sub-net data between nodes. The disclosed SD-WAN system overcomes the scalability problems described above by employing BGP to work with SD-WAN. The disclosed SD-WAN system uses BGP to exchange WAN port data between peers via the local controller. This offloads related processing to the peers to increase scalability. Further, disclosed SD-WAN system extends BGP to include WAN port properties (e.g., including secure information), and not public sub-net information.

Optionally, in any of the preceding aspects, another implementation of the aspect provides, wherein the NLRI field is included in a SD-WAN subsequent address family identifier (SAFI) for advertising properties of SD-WAN ports that face untrusted networks. Some systems employ an internet protocol (IP) SAFI to describe sub-net data. The disclosed embodiments employ an overlay SAFI (e.g., a SD-WAN SAFI) that is a different address family for describing port properties related to an overlay network, such as SD-WAN.

Optionally, in any of the preceding aspects, another implementation of the aspect provides, wherein the SD-WAN SAFI includes a NLRI length field indicating a length of the NLRI, a SD-WAN type field defining an encoding of the NLRI field, a port distinguisher including a SD-WAN edge node port identifier (ID), a SD-WAN site ID identifying a common property shared by a set of SD-WAN edge nodes, and a SD-WAN node ID identifying the SD-WAN edge node.

Optionally, in any of the preceding aspects, another implementation of the aspect provides, wherein the port distinguisher uniquely identifies a corresponding SD-WAN port, and wherein the port distinguisher includes an internet protocol (IP) address of the corresponding SD-WAN port, network address translation (NAT) information for a private IP address, and IP security (IPsec) security association related information for the corresponding SD-WAN port.

Optionally, in any of the preceding aspects, another implementation of the aspect provides, wherein the common property indicated in the SD-WAN site ID is used to steer an overlay route to traverse specific geographic regions for policy reasons.

Optionally, in any of the preceding aspects, another implementation of the aspect provides, wherein the NLRI is described by a tunnel encapsulation attribute including a tunnel type indicating a SD-WAN port property, a NAT sub-type length value (TLV) describing information regarding SD-WAN tunnel end points, an IPsec security association (SA) attribute sub-TLV including information for establishing IPsec SAs with the peer node, and a port sub-TLV including additional properties of the corresponding SD-WAN port.

In an embodiment, the disclosure includes a Software Defined Wide Area Network (SD-WAN) edge node comprising a processor, a receiver coupled to the processor, and a transmitter coupled to the processor, the processor, receiver, and transmitter configured to perform the method of any of the preceding aspects.

In an embodiment, the disclosure includes a non-transitory computer readable medium comprising a computer program product for use by a network node, the computer program product comprising computer executable instructions stored on a non-transitory computer readable medium such that when executed by a processor cause the network node to perform steps of any of the preceding aspects.

In an embodiment, the disclosure includes Software Defined Wide Area Network (SD-WAN) edge node comprising a transmitting means for transmitting a first Border Gateway Protocol (BGP) update message advertising wide area network (WAN) properties of edge node SD-WAN ports of the SD-WAN edge node to a local controller via an encrypted channel over untrusted underlay networks; a receiving means for receiving a second BGP update message from the local controller, the second BGP update message advertising WAN properties of peer node SD-WAN ports of a peer node; and a processing means for establishing a security association with the peer node or the peer node SD-WAN ports of the peer node over the untrusted underlay networks based on the WAN properties of the edge node SD-WAN ports and the WAN properties of the peer node SD-WAN ports.

Optionally, in any of the preceding aspects, another implementation of the aspect provides, wherein the transmitting means, receiving means, and processing means are further for performing any of the preceding aspects.

In an embodiment, the disclosure includes a local controller comprising a receiving means for receiving a first Border Gateway Protocol (BGP) update message advertising a first WAN properties of first peer node Software Defined Wide Area Network (SD-WAN) ports of a first peer node via a first encrypted channel over one or more untrusted underlay networks; and receiving a second BGP update message advertising a second WAN properties of second peer node SD-WAN ports of a second peer node via a second encrypted channel over the untrusted underlay networks; a processing means for processing the first BGP update message and the second BGP update message; and a transmitting means for forwarding the first BGP update message to the second peer node; and forwarding the second BGP update message to the first peer node to support establishment of a security association between the first peer node SD-WAN ports and the second peer node SD-WAN ports based on the first WAN properties and the second WAN properties.

Optionally, in any of the preceding aspects, another implementation of the aspect provides, wherein the transmitting means, receiving means, and processing means are further for performing any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
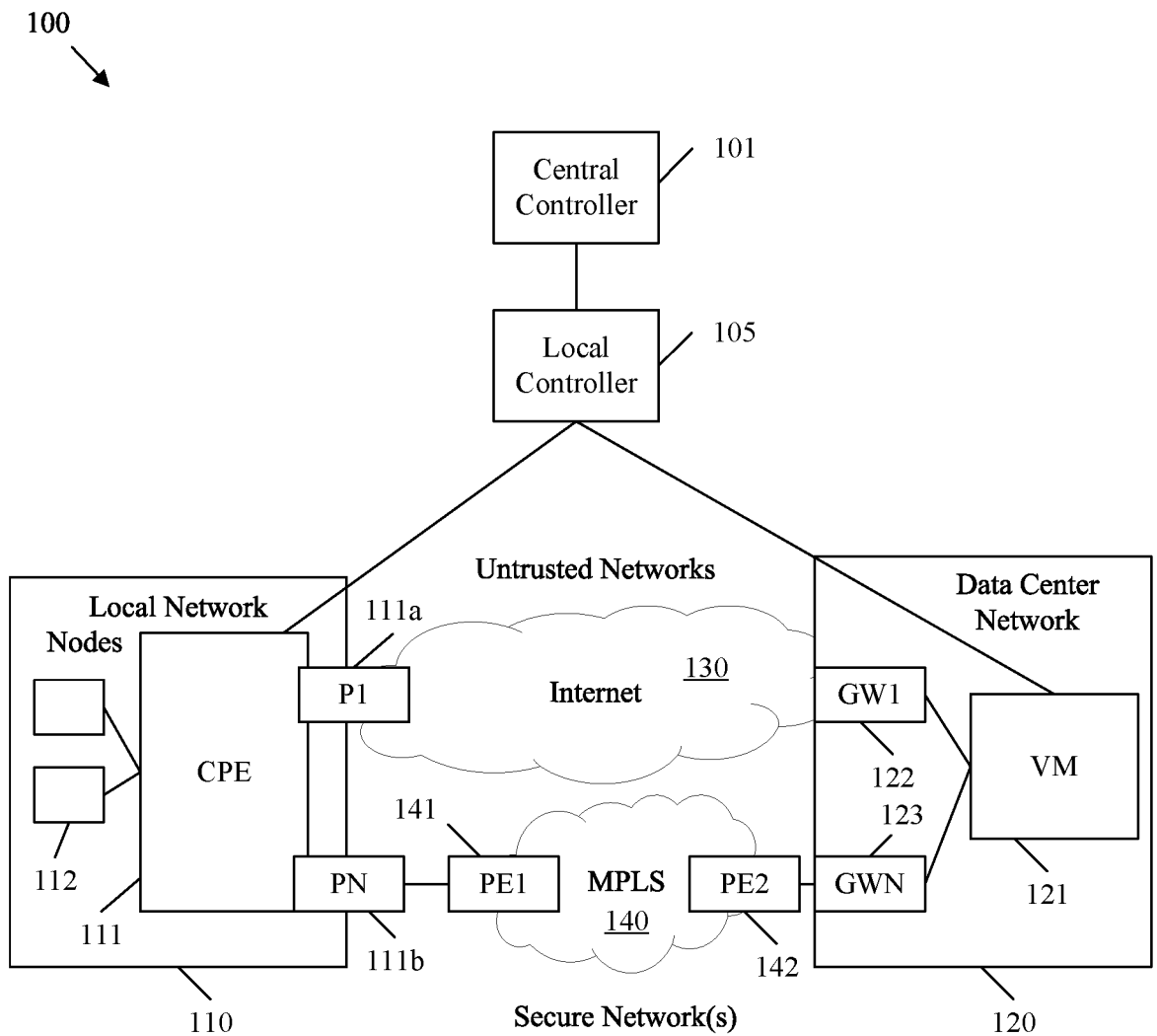
FIG. 1 is a schematic diagram of an example SD-WAN network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A SD-WAN is an example network that can implement complex routing schemes for a dynamically changing network topology. A SD-WAN is a wide area network (WAN) implemented to decouple network control mechanisms from network hardware using software defined networking paradigms. This simplifies network management and operation by allowing network nodes to be managed based on functional groups rather than by hardware relationships. A WAN is a communications network that extends over a wide geographical area (e.g., multi-country/global network). A SD-WAN may be implemented as a network overlay that operates via tunnels through a plurality of physical networks. For example, a SD-WAN may transport data for many types of devices operating in a plurality of physically distant networks. Such devices may include personal computers in a local area network (LAN), virtual machines (VM) in a public and/or private cloud network, dedicated servers in a datacenter, etc. A SD-WAN may be configured to securely and dynamically adjust routing according to specified network policies based on changing network needs, for example without involving a human network administrator to configured specific network routes.

A SD-WAN may be configured to transmit data over both secure and unsecure networks. For example, IPsec tunnels may be used to transmit data over such unsecure networks. In order to set up such IPsec tunnels, security information is exchanged between tunnel end points. In some systems, a hub and spoke model is employed to distribute such information. For example, a local controller can act as the hub and maintain security information for various SD-WAN nodes. A SD-WAN node can then request such security information from the local controller when needed to allow the SD-WAN node to establish a secure route to a particular peer node. For example, next hop resolution protocol (NHRP), dead simple virtual private network (DSVPN), and/or dynamic multi-point virtual private network (DMVPN) protocols can be used to distribute SD-WAN node information between peer nodes via the local controller.

This approach, however, has certain shortcomings. For example, this approach may requires the local controller to maintain an awareness of security and address information for all (or a substantial sub-set) of the nodes in the SD-WAN network. Further, this approach may require the local controller to be involved in the creation of every tunnel in the SD-WAN network. As such, this approach may not be completely scalable for large networks. For example, the abovementioned approach may work well for a moderate number of nodes. However, this approach may break down (e.g., become complex, error prone, and/or poorly functional) when a SD-WAN employs a large number of nodes (e.g., one hundred or more SD-WAN nodes) that employ complex topologies with multiple tenant groups.

Disclosed herein is a mechanism for distributing SD-WAN node port information, also known as NLRI, in a manner that is scalable to large and complex network topologies. For example, BGP can be used to distribute SD-WAN port information between peer nodes via a local controller. By using a BGP update message, the SD-WAN port information can be forwarded between peers in a tenant group, but need not be maintained and managed by the local controller. This relieves computational burden on the local controller when the network scales to a large number of nodes. In some systems, BGP may be used to forward sub-net information and may communicate unsecure data. Accordingly, the present disclosure modifies BGP to carry SD-WAN port information, which includes security information, in a secure fashion. For example, a SD-WAN edge node may communicate with a central controller on startup. The address of the central controller may be hard coded into the SD-WAN edge node in some examples. As a specific example, a manufacturer can write a universal resource locator (URL), IP address, or other network address of the central controller into the memory (e.g., firmware) of the SD-WAN edge node at the time of manufacture. The SD-WAN edge node can then obtain the address of the central controller upon startup. The central controller can designate a local controller, such as a route reflector (RR), for a peer group containing the SD-WAN edge node. The SD-WAN edge node can transmit SD-WAN port information to the local controller in a BGP update message via a secure channel. The local controller can then forward the BGP update message to peer nodes via secure channels. The local controller can also forward BGP updates from the peer nodes back to the SD-WAN edge node. This allows the SD-WAN edge node to establish secure connections with the peer nodes. Such BGP update messages may be sent periodically and/or on the occurrence of events such as a change in topology, a node is added, a node disconnects, etc. to allow each node in the peer group to maintain awareness of the SD-WAN port information of the other nodes.

The BGP update message may carry SD-WAN port capabilities and tunnel end-point attributes. This may include both public and private addresses and ports, network address translation (NAT) data, IPsec capabilities, SD-WAN routing policies, tunnel encryption data (e.g., encryption keys), etc. As noted above, BGP may not be designed to carry secure information. The present disclosure includes BGP modifications to carry such data. In one example implementation, the BGP update message carries a SD-WAN SAFI. The SD-WAN SAFI alerts the local controller that the BGP update message carries SD-WAN port information and not sub-net data. The local controller can then handle the BGP update message securely and forward the BGP update message only to authorized peers. In another example, an IP SAFI is used instead of a SD-WAN SAFI. The local controller searches each BGP update message. Upon finding SD-WAN port information, the local controller then handles the BGP update message securely and forwards the BGP update message only to authorized peers. IP SAFI is backwards compatible, but may require more local controller resources than an implementation that employs a SD-WAN SAFI.

FIG. 1 is a schematic diagram of an example SD-WAN network 100. In the example shown, the SD-WAN network 100 includes a local network 110 coupled to a data center network 120 via both one or more untrusted networks and one or more trusted networks. The untrusted networks may include the public Internet 130. The trusted networks may include a private Multiprotocol Label Switching (MPLS) network 140. The local network 110 includes one or more local nodes 112 communicating via a customer premises equipment (CPE) 111. The data center network 120 includes a virtual machine (VM) 121 communicating via a number N of gateways 122 and 123, denoted as GW1 through GWN. The SD-WAN network 100 also includes a central controller 101 and a local controller 105 configured to manage and operate the corresponding network.

A SD-WAN network 100 may be implemented to have many different topologies or configurations. In the example shown, the local network 110 is configured to communicate with peers at the data center network 120. The local network 110 is a communication system capable of propagating data between connected nodes (e.g., in a single building and/or small campus of buildings). As a particular example, the local network 110 may operate in a single office and may be designed to connect the office to a corporate network spanning many offices in many locations spread across the world. The local network 110 includes local nodes 112. The local nodes 112 may include any communication devices that communicate over a local area network (LAN). For example, the local nodes 112 may include personal computers or other user terminals, printers, tablets, smart phones, televisions, internet of things (IoT) devices, etc. The local nodes 112 in the local network 110 communicate with the outside world via the CPE 111. The CPE 111 may act as a SD-WAN edge node, and hence may be configured to connect the local network 110 to the SD-WAN. The CPE 111 is any network device capable of acting as a gateway for the local network 110. The CPE 111 may have any number N of ports 111a and 111b, denoted as P1 through PN. In the example shown, port 111a is coupled to the Internet 130 and port 111b is coupled to the MPLS network 140. As ports 111a and 111b should connect the CPE 111 to the SD-WAN, the ports 111a and 111b may act as SD-WAN ports.

In a particular example, the CPE 111 may be setup by a non-expert user. Hence, the CPE 111 may be designed to connect to the SD-WAN network 110 with minimal input from the user. Accordingly, the CPE 111 may be designed to perform an auto configuration to connect the local network 110 to the SD-WAN network 100. Upon startup, the CPE 111 may determine an associated central controller 101 and initiate a communication. The central controller 101 may be a network device capable of setting and managing high level network wide operations, such as setting policies, managing network load balances, operating network accounting features, etc. The CPE 111 may determine the central controller 101 by consulting data hardcoded into memory, by communicating with a default address, based on user input, etc. The CPE 111 can set up a secure channel (e.g., over the Internet 130) for communicating with the central controller 101 to obtain further instructions. For example, such secure channel may be a transport layer security (TLS) or secure socket layer (SSL) channel. The central controller 101 can then assign a local controller 105 to the CPE 111. For example, the local controller 105 can be assigned based on the tenant(s) associated with CPE 111 in order to assist the CPE 111 in connecting the local network 110 to the proper group of network peers.

The local controller 105 is a network device capable of controlling network route management, network security, network communication sessions, etc. The local controller 105 is local in the sense that the local controller 105 may not be global for the entire SD-WAN network. The local controller 105 may be local to one or more peer groups and may support communication functions between such peers. The local controller 105 may or may not be in close physical proximity to the CPE 111. For example, the central controller 101 may designate a local controller 105 in the same country as the local network 110. The local controller 105 may operate BGP and may be configured as a BGP route reflector. The CPE 111 may communicate with the local controller 105 via an untrusted network, such as the Internet 130. Accordingly, the CPE 111 may setup a secure channel (e.g., TLS, SSL, etc.) with the local controller 105. The CPE 111 may then forward a BGP update to the local controller 105 over the secure channel. The BGP update may contain data describing the ports 111a and 111b which should connect to the SD-WAN. By forwarding the BGP update over the secure channel, the SD-WAN port information related to the ports 111a and 111b may be secured when traversing the untrusted network. The local controller 105 can then exchange relevant SD-WAN port information between network peers to support setting up overlay tunnels to connect the CPE 111 to the correct peers in the SD-WAN. In a BGP context, NLRI is data usable to connect to a corresponding node. As such, the SD-WAN port information can be communicated as NLRI when included in a BGP message.

In the example shown, the CPE 111 is coupled to the Internet 130 and an MPLS network 140. The Internet 130 is a global system of inter connected computer networks that links devices worldwide. The Internet 130 includes many sub-networks as is generally considered to be unsecure. An MPLS network 140 is high performance network capable of communicating data according to a MPLS routing technique. The MPLS network 140 includes a plurality of provider edges (PEs) 141 and 142. A PE 141/142 is a device capable of acting as entry and exit points for the MPLS network 140. A MPLS network 140 is generally managed by a service provider, and hence PEs 141 and 142 act as edges of the provider's network. The MPLS routing technique involves switching packets according to labels. This allows switching to occur without examining the underlying packet. For example, a route can be set up prior to initiating communication across the MPLS network 140. A packet may enter the MPLS network 140 at PE 141. In such a case, PE 141 pushes a first label onto the packet based on the route. The packet is then switched to a first internal node in the MPLS network 140 based on the first label. The internal node pops the first label off, applies a second label based on the route associated with the first label, and routes the packet based on the second label. This process continues until the packet is received by PE 142, which pops off the final label and routes the packet toward the data center network 120. A packet from the data center network 120 traverses the MPLS network 140 in a similar fashion except PE 142 pushes on the first label and PE 141 pops off the last label. The MPLS network 140 provides security at PEs 141 and 142 and may not review the contents of the packets at the internal nodes. Accordingly, the MPLS network 140 is considered to be a secure network, and routes that traverse the MPLS network 140 may not need to be protected by additional security protocols, such as IPsec, TLS, SSL, etc.

Communication session to and from the nodes 112 may be conducted according to various policies. Policies may require certain communications to traverse the MPLS network 140 and not the Internet 130. Other policies may require that certain communications avoid certain networks (e.g., portions of the Internet 130 positioned in certain countries or managed by specified providers). Other communications may be routed according to any available route so long as the communication is secured, for example by IPsec. In order to comply with such policies and perform load balancing when communicating data across the SD-WAN network 100, peer nodes should be aware of relevant SD-WAN port information. As such, the SD-WAN port information related to the ports 111a and 111b (communicated by the CPE 111) may describe which ports 111a and 111b are connected to which network, public and private IP addresses, public and private port identifiers (IDs), port security capabilities, and/or other connectivity/security related information to support establishing secure connections as dictated by the relevant network policies.

The data center network 120 is a pool of interconnected computing resources. In a cloud computing model, a data center network 120 includes hardware resources that can be elastically provisioned to various processes based on the changing needs of such processes. Such hardware resources may include processing resources, memory resources, cache resources, network communication resources, etc. In some deployments, virtual machines (VMs) 121 may employ such resources. A VM 121 is a platform that emulates a computing machine, such as a server. A VM 121 may operate various applications on behalf of a tenant. Hardware resources can be allocated to the VM 121 as needed to operate the associated applications and deallocated when no longer needed. In this way, the hardware resources can be shared by many VMs 121 without over provisioning resources to any one VM 121. The data center network 120 may also include a number N of gateways denoted as GW1 122 to GWN 123. GW1 122 and GWN 123 are entry and exit points of the data center network 120. GW1 122 and GWN 123 may be configured to apply security protocols, may have IP addresses and port IDs, and may be connected to the Internet 130 and/or the MPLS network 140. In the present example, the VM 121 may act as a peer node in the SD-WAN network. Further, the VM 121 may act as a SD-WAN edge node and may treat GW1 122 and GWN 123 as SD-WAN ports. The VM 121 may receive a BGP update from the local controller 105 via a secure channel. The BGP update may contain SD-WAN port information related to ports 111a and 111b of CPE 111. The VM 121 may respond by sending a BGP update to the local controller 105 containing SD-WAN port information describing GW1 122 and GWN 123. The BGP update message may be sent via a secure channel and propagated back to the CPE 111 through the local controller 105. Once the VM 121 has the SD-WAN information of ports 111a and 111b and the CPE 111 has the SD-WAN information of GW1 122 and GWN 123, the VM 121 and the CPE 111 can establish secure communications via the Internet 130 and/or MPLS network 140 as needed to comply with the corresponding policies. The local network 110 may then be connected to the SD-WAN network via the CPE 111 and may communicate securely as desired.

Figure 2:
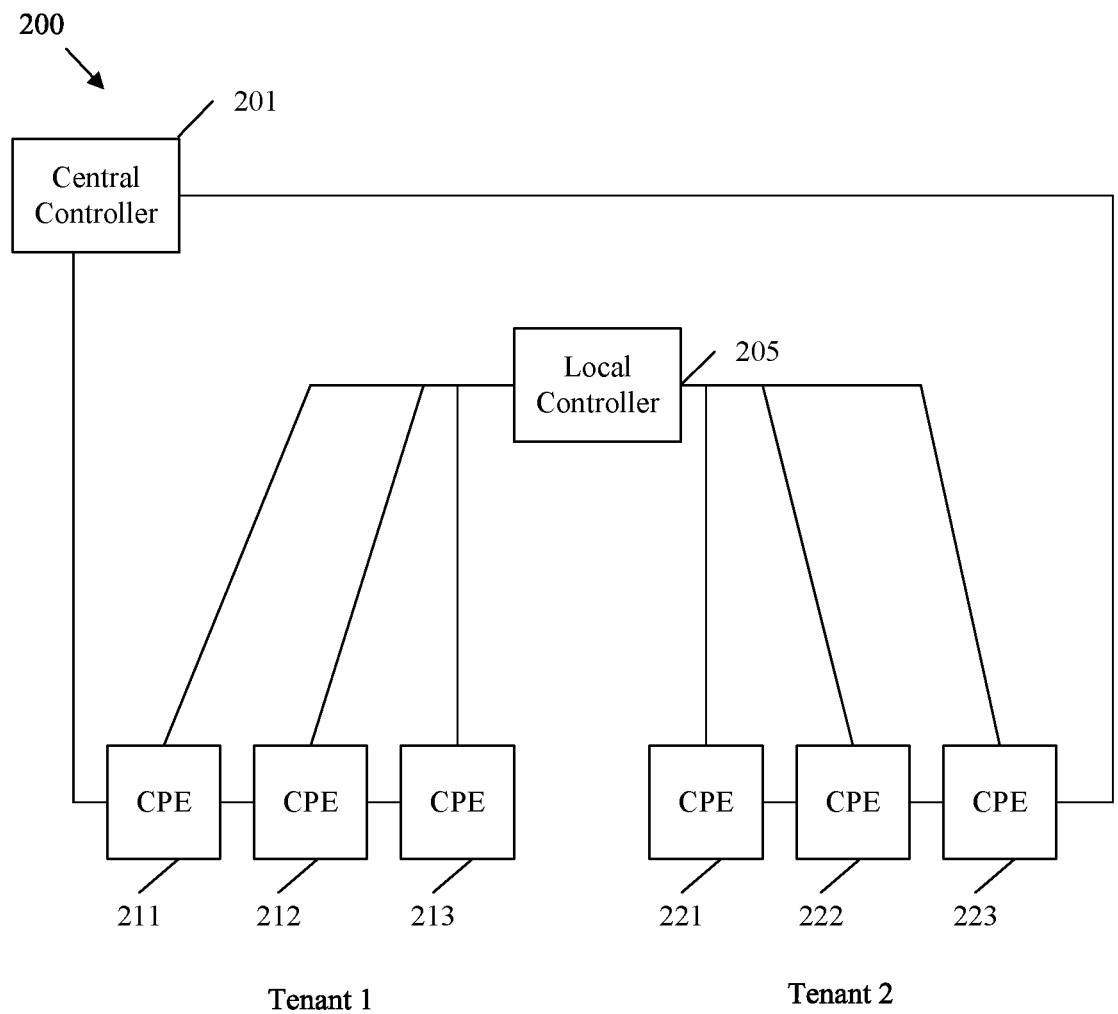
FIG. 2 is a schematic diagram of an example SD-WAN network used by multiple tenant groups.

FIG. 2 is a schematic diagram of an example SD-WAN network 200 used by multiple tenant groups. For example, the SD-WAN network 200 may contain a first tenant group containing CPE 211, CPE 212, and CPE 213. The SD-WAN network 200 may also contain a second tenant group containing CPE 221, CPE 222, and CPE 223. CPEs 211, 212, 213, 221, 222, and 223 may each be substantially similar to CPE 111 and/or VM 121, depending on the example. Further, while three CPEs are shown in each tenant group, any number of CPEs, VMs, and/or other SD-WAN edge nodes may be employed in each tenant group. Each CPE may be connected to a local network, data center network, etc. containing one or more nodes capable of communicating data over the SD-WAN network 200. The SD-WAN network 200 also includes a central controller 201 and a local controller 205, which may be substantially similar to the central controller 101 and the local controller 105, respectively.

A CPE 211 in the first tenant group may send a BGP update to the local controller 205. In this case, the local controller 205 sends the BGP update to the other CPEs 212 and 213 in the first tenant group. The CPEs 212 and 213 may respond with BGP updates, which are sent back to CPE 211 (and/or each other in some examples). However, the local controller 205 does not share BGP updates from the first tenant group with CPEs 221, 222, and/or 223 of the second tenant group. Likewise, the local controller 205 shares BGP updates between the CPEs 221, 222, and/or 223 of the second tenant group. However, the local controller 205 does not share BGP updates from the second tenant group with the CPEs 211, 212, and/or 213 of the first tenant group.

Figure 3:
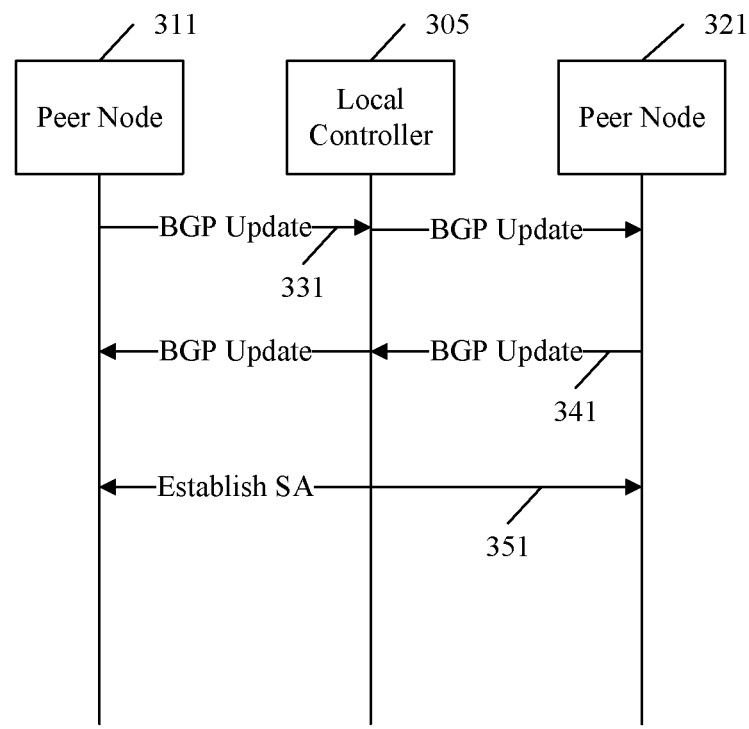
FIG. 3 is a protocol diagram of an example method of using Border Gateway Protocol (BGP) to distribute SD-WAN port information using a SD-WAN Subsequent Address Family Identifier (SAFI).

FIG. 3 is a protocol diagram of an example method 300 of using BGP to distribute SD-WAN port information using a SD-WAN SAFI. For example, method 300 may be employed to communicate SD-WAN port information of nodes in a SD-WAN network 100 and/or 200. As a further example, the method 300 may be employed to communicate data related to ports 111a and/or 111b, GW1 122 and/or GWN 123, and/or ports of CPEs 211, 212, 213, 221, 222, and/or 223. Method 300 operates via a local controller 305, which may be substantially similar to the local controller 105 and/or 205. Method 300 also operates on peer nodes 311 and 321, which may be any SD-WAN capable device in a common tenant group. For example, peer nodes 311 and 321 may be similar to CPE 111, 211, 212, 213, 221, 222, 223 and/or VM 121.

The method 300 begins with a peer node 311 sending a BGP update 331 to the local controller 305 via a secure channel. The BGP update 331 may be sent periodically and/or upon initiation of operation of the peer node 311. The BGP update 331 is a BGP message containing SD-WAN port information of peer node 311 ports as NLRI. In method 300, the BGP update 331 contains a SD-WAN SAFI. A SAFI is an address space. Some systems employing BGP messages may be configured to employ an IP SAFI and hence an IP address space. BGP messages with an IP SAFI may be assumed to contain sub-net information. The presence of a SD-WAN SAFI indicates to the local controller 305 that the BGP update 331 contains SD-WAN port information and not simply sub-net information related to the peer node 311. As the SD-WAN SAFI employs a different address space, the BGP update 331 can contain data related to a plurality (e.g., all) of the SD-WAN capable ports at the peer node 311. For example, the BGP update 331 may contain NLRI of the peer node's 311 ports that describe SD-WAN port capabilities and tunnel end-point attributes. As a specific example, the NLRI of the SD-WAN ports in the BGP update 331 may include tunnel end point(s), private port address(es), public port address(es), private IP address(es), public IP address (es), IPsec capability of the port(s), one or more SD-WAN routing policies, tunnel encryption data (e.g., security keys), network address translation (NAT) information, or combinations thereof. The local controller 305 receives the BGP update 331, determines the relevant tenant group based on the SD-WAN SAFI, and forwards the BGP update 331 to the nodes in the same tenant group as the peer node 311. As such, the local controller 305 forwards the BGP update 331 to the peer node 321.

The peer node 321 receives the BGP update 331 and stores the NLRI/SD-WAN port information of the peer node 311. The peer node 321 may respond by sending a BGP update 341 to the local controller 305 via a secure channel. The BGP update 341 may be sent periodically and/or in response to the BGP update 331. The BGP update 341 is substantially similar to the BGP update 331, but contains the NLRI/SD-WAN port information of the peer node 321. As with the BGP update 331, the BGP update 341 employs a SD-WAN SAFI, and hence includes the SD-WAN port information of a plurality/all of peer node's 321 SD-WAN capable ports. The local controller 305 receives the BGP update 341, determines the relevant tenant group based on the SD-WAN SAFI, and forwards to the BGP update 341 to the nodes in the same tenant group as the peer node 321. Accordingly, the local controller 305 forwards the BGP update 341 to the peer node 311, which stores the NLRI/SD-WAN port information of the peer node 321.

Once the BGP updates 331 and 341 have been securely exchanged between the peer nodes 311 and 321, the peer nodes 311 and 321 have information sufficient to establish a security association (SA) 351. A SA 351 is a secure channel between nodes, in this case between peer nodes 311 and 321. The peer nodes 311 and 321 can establish the SA 351 by exchanging secure keys between the SD-WAN ports based on the SD-WAN port information contained in the BGP updates 331 and 341. Further, the SA 351 may provide a secure communication channel over an untrusted network, such as the Internet. Once the SA 351 is established, the peer nodes 311 and 321 are connected to the same SD-WAN and can communicate data to and from associated local nodes attached to the peer nodes 311 and 321.

Employing a SD-WAN SAFI in method 300 results in several benefits. For example, the SD-WAN SAFI is a different address space, and hence IP related rules need not apply. As such, data related to multiple ports and/or multiple IP addresses may be exchanged in a single message. Further, the local controller 305 may determine the BGP update messages 331 and 341 contain SD-WAN port information based solely on the presence of the SD-WAN SAFI. One potential issue with using a SD-WAN SAFI is that method 300 may not be backwards compatible. For example, a legacy routing device handling the BGP update messages 331 and 341 may drop such messages if the SD-WAN SAFI is not recognized. Method 400 as described below provides an example mechanism that is backwards compatible and works with legacy routing devices at the cost of additional signaling and additional processing.

Figure 4:
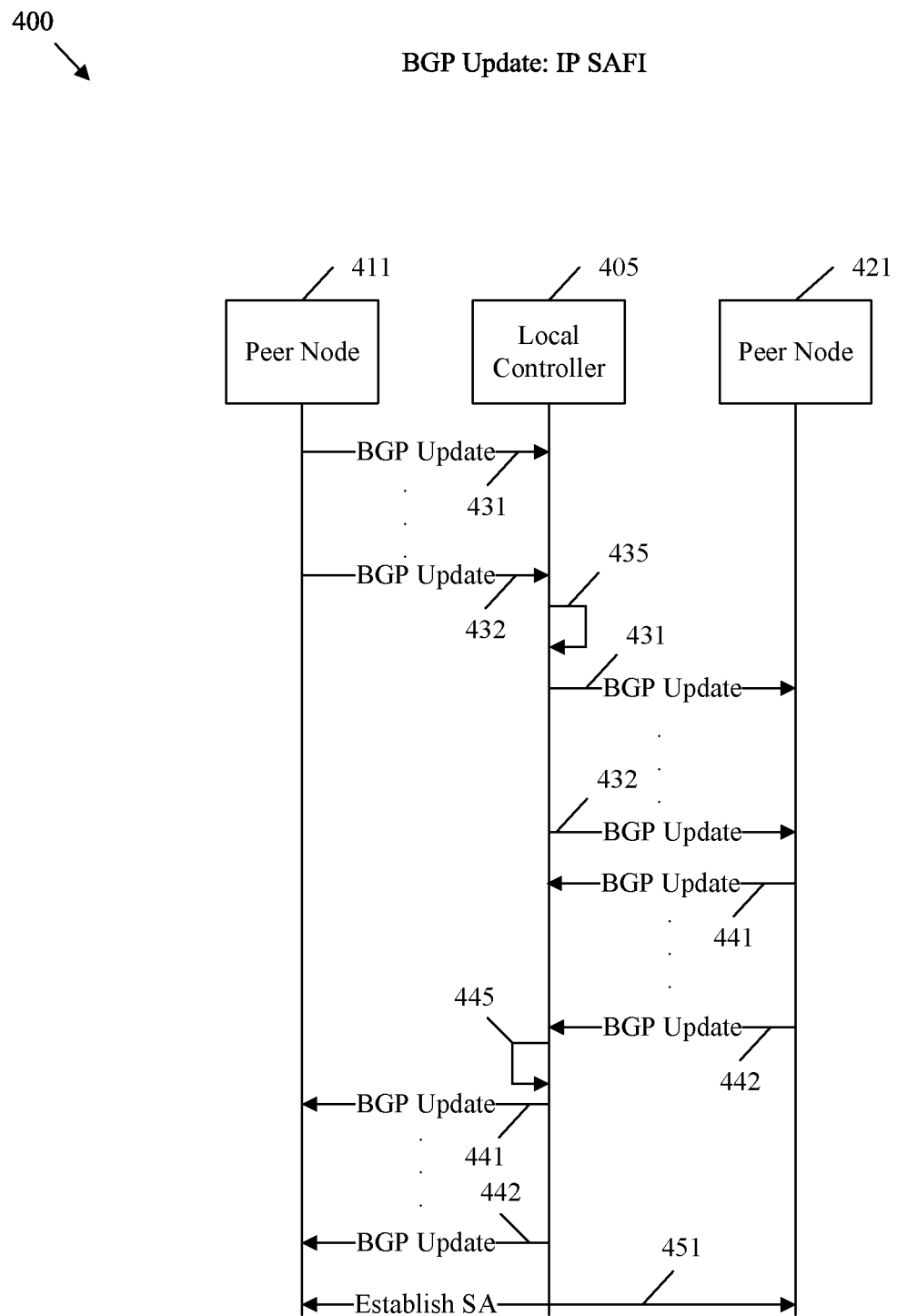
FIG. 4 is a protocol diagram of an example method of using BGP to distribute SD-WAN port information using an internet protocol (IP) SAFI.

FIG. 4 is a protocol diagram of an example method 400 of using BGP to distribute SD-WAN port information using an IP SAFI. For example, method 400 may be employed to communicate SD-WAN port information of nodes in a SD-WAN network 100 and/or 200. As a further example, the method 400 may be employed to communicate data related to ports 111a and/or 111b, GW1 122 and/or GWN 123, and/or ports of CPEs 211, 212, 213, 221, 222, and/or 223. Method 400 operates via a local controller 405, which may be substantially similar to the local controller 105 and/or 205. Method 400 also operates on peer nodes 411 and 421, which may be any SD-WAN capable device in a common tenant group. For example, peer nodes 411 and 421 may be similar to CPE 111, 211, 212, 213, 221, 222, 223 and/or VM 121. Method 400 is substantially similar to method 300, but operates by using BGP update messages with an IP SAFI instead of a SD-WAN SAFI.

The method 400 begins with a peer node 411 sending BGP updates 431 and 432 to the local controller 405 via a secure channel. The BGP updates 431 and 432 may be sent periodically and/or upon initiation of operation of the peer node 411. The BGP updates 431 and 432 are similar to BGP update 331, but employ an IP SAFI instead of a SD-WAN SAFI. As an IP SAFI is employed, the SD-WAN information for each port of the peer node 411 is included in a separate BGP update message. Accordingly, BGP updates 431 and 432 include a number of BGP update messages equal to the number of SD-WAN capable ports at the peer node 411. As an example, BGP update 431 may contain the SD-WAN information related to a first port at the peer node 411, BGP update 432 may contain the SD-WAN information related to a second port at the peer node 411, etc.

The BGP updates 431 and 432 are received by the local controller 405. The local controller processes 435 the BGP updates 431 and 432. As an IP SAFI is employed, the local controller 405 may not immediately recognize that the BGP updates 431 and 432 contain SD-WAN information. Processing 435 may include reviewing the contents of the BGP updates 431 and 432, for example until SD-WAN information, such as tunnel data, security data, etc., is found. Such information may allow the local controller 405 to differentiate between BGP updates 431 and 432 with SD-WAN information and BGP update messages that contain general routing data (e.g., that is not secure and is not related to SD-WAN connectivity). After processing 435, the local controller 405 forwards the BGP updates 431 and 432 to the SD-WAN edge nodes in the same tenant group as the peer node 411. Accordingly, the local controller 405 forwards the BGP updates 431 and 432 to the peer node 421.

The peer node 421 receives the BGP updates 431 and 432 and stores the NLRI/SD-WAN port information of the peer node 411. The peer node 421 may respond by sending BGP updates 441 and 442 to the local controller 405 via a secure channel. The BGP updates 441 and 442 may be sent periodically and/or in response to the BGP updates 431 and 432. The BGP updates 441 and 442 are substantially similar to the BGP updates 431 and 432, but contain the NLRI/SD-WAN port information of the peer node 421. As with the BGP updates 431 and 432, the BGP updates 441 and 442 employ an IP SAFI. Accordingly, the NLRI/SD-WAN port information for each port of the peer node 421 is included in a separate BGP update message. As such, BGP updates 441 and 442 include a number of BGP update messages equal to the number of SD-WAN capable ports at the peer node 421.

The local controller 405 receives and processes 445 the BGP updates 441 and 442. As with processing 435, processing 435 includes reviewing the contents of the BGP updates 441 and 442 until SD-WAN information, such as tunnel data, security data, etc., is found. Once the local controller 405 determines that the BGP updates 441 and 442 contain SD-WAN NLRI, the local controller 405 determines the relevant tenant group, and forwards to the BGP updates 441 and 442 to the nodes in the same tenant group as the peer node 421. Accordingly, the local controller 405 forwards the BGP updates 441 and 442 to the peer node 411. The peer nodes 411 and 421 can then establish a SA 451 using the SD-WAN information for the relevant ports in a manner that is substantially similar to establishing the SA 351 in method 300.

Figure 5:
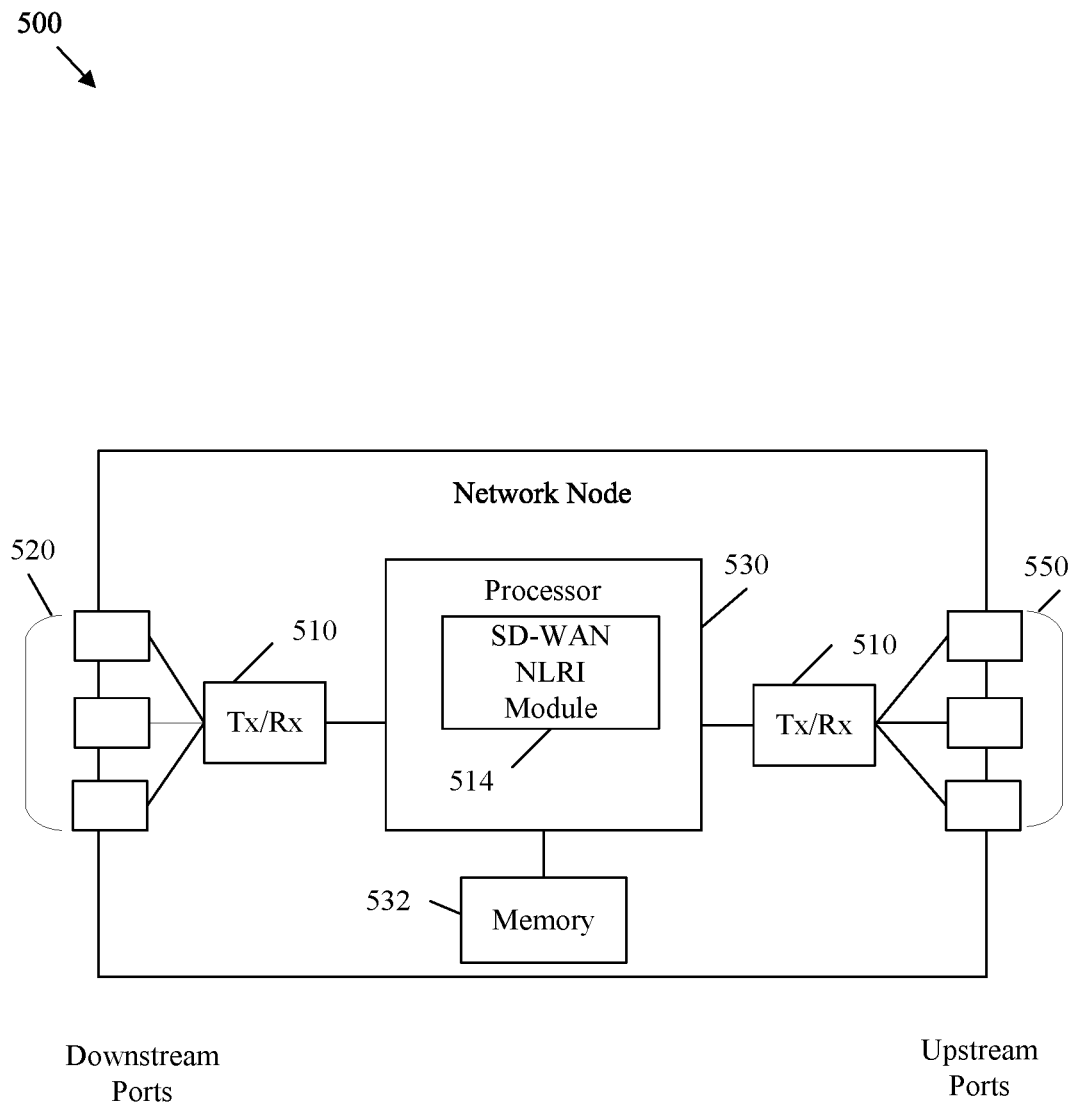
FIG. 5 is a schematic diagram of an example network node for use in a SD-WAN network.

FIG. 5 is a schematic diagram of an example network node 500 for use in a SD-WAN network, such as in SD-WAN network 100 and/or 200. The network node 500 is suitable for implementing the disclosed examples/embodiments as described herein. For example, the network node 500 may implement an SD-WAN edge node, such as a CPE and/or VM, a local controller, and/or a central controller.

The network node 500 comprises downstream ports 520, upstream ports 550, and/or transceivers (Tx/Rx) 510, including transmitters and/or receivers for communicating data upstream and/or downstream over a network. The network node 500 also includes a processor 530 including a logic unit and/or central processing unit (CPU) to process the data and a memory 532 for storing the data.

The network node 500 may also comprise electrical, optical-to-electrical (OE) components, electrical-to-optical (EO) components, and/or wireless communication components coupled to the upstream ports 550 and/or downstream ports 520 for communication of data via electrical, optical, or wireless communication networks. The Tx/Rx 510 may perform network communications over an associated medium via the downstream ports 520 and/or upstream ports 550, depending on the example. For example, the Tx/Rx 510 may include a modulator demodulator (modem), network card, or other communication circuitry for communications over telephony, digital subscriber line (DSL) and/or coaxial line communications systems. In other examples, the Tx/Rx 510 may include a laser emitter, a waveguide, an optical modulator, and/or an optical receiver for communications over a fiber optic communications system. In still other examples, the Tx/Rx 510 may include one or more antenna capable of wireless communication via long term evolution (LTE), third generation (3G), fourth generation (4G), fifth generation (5G), or other internet capable mobile communications networks.

The processor 530 is implemented by hardware and software. The processor 530 may be implemented as one or more CPU chips, cores (e.g., as a multi-core processor), field-programmable gate arrays (FPGAs), application specific integrated circuits (ASICs), and digital signal processors (DSPs). The processor 530 is in communication with the downstream ports 520, Tx/Rx 510, upstream ports 550, and memory 532. The processor 530 comprises a SD-WAN NLRI module 514. The SD-WAN NLRI module 514 implements the disclosed embodiments described herein, such as methods 300, 400, 1000, 1100, and/or 1200 which may employ a SD-WAN SAFI 600, a tunnel encapsulation attribute TLV 700, a SD-WAN port sub-TLV 800, and/or a IPsec sub-TLV 900. The SD-WAN NLRI module 514 may also implement any other method/mechanism described herein. For example, the SD-WAN NLRI module 514 can transmit, receive, and/or process BGP update messages containing SD-WAN port information relating to peer SD-WAN edge nodes.

In some examples, the BGP update messages may contain the SD-WAN port information encoded in a SD-WAN NLRI. Hence, SD-WAN NLRI module 514 allows the network node 500 to automatically configure and establish secure connections between peer SD-WAN edge nodes without over taxing a local controller when the SD-WAN includes many such peer nodes (e.g., one hundred plus peer nodes in a tenant group). As such, the SD-WAN NLRI module 514 provides additional and improved functionality for the network node 500 as well as addresses problems that are specific to the network communications arts. Further, the SD-WAN NLRI module 514 effects a transformation of the network node 500 to a different state. The SD-WAN NLRI module 514 can be implemented in hardware or as instructions stored in the memory 532 and executed by the processor 530 (e.g., as a computer program product stored on a non-transitory medium).

The memory 532 comprises one or more memory types such as disks, tape drives, solid-state drives, read only memory (ROM), random access memory (RAM), flash memory, ternary content addressable memory (TCAM), static random-access memory (SRAM), etc. The memory 532 may be used as an over-flow data storage device, to store programs when such programs are selected for execution, and to store instructions and data that are read during program execution.

The following describes example implementations of the SD-WAN port information communication schemes discussed above. SD-WAN may be employed to reach dynamic workloads in multiple third-party data centers and aggregate multiple underlay paths, including public untrusted networks, provided by different service providers. Multiple SD-WAN scenarios involve using BGP as a control plane for the SD-WAN networks. Further, BGP update messages can be used to advertise endpoints' tunnel encapsulation capabilities and the respective attached client routes, so that the receivers of the BGP update can establish appropriate tunnels to the endpoints for the aforementioned client routes. Some example scenarios use a remote endpoint sub-TLV for one node to advertise another node's encapsulation capabilities. In such cases, the receivers of the tunnel update may construct the encapsulation header with an outer destination address equal to the address carried in the remote endpoint sub-TLV. All those implementations have nothing to do with SD-WAN edge WAN port properties registration.

This disclosure describes a BGP NLRI and SAFI for SD-WAN edge nodes to register (or propagate) their WAN ports properties. This SAFI and NLRI may be used for a scenario where one SD-WAN edge node has multiple WAN ports, some of which are connected to private networks and others are connected to public untrusted networks. The same routes attached to the SD-WAN can be sent/received over the private networks without encryption (for better performance) and sent/received over the public networks with encryption. The following functional components of the control plane can be employed for this scenario. Each SD-WAN edge node is informed of its SD-WAN controller, either burned in the node or configured. The SD-WAN controller may be a BGP RR.

Each SD-WAN edge node may advertise its WAN ports properties via the secure channel with the RR. The RR then propagates the received WAN ports properties to the authorized peers based on appropriate policies. Because the connections among SD-WAN edges and the RR can be public untrusted networks, the communication session between RR and SD-WAN edges may run over a secure channel (e.g., TLS, datagram TLS (DTLS), or others). SD-WAN edges may perform pairwise secure channel establishment, such as IPsec parameters negotiation, public key exchange, etc. Further, SD-WAN edge nodes may perform client route distribution in a manner similar to Ethernet virtual private network (EVPN) or layer three virtual private network (L3VPN) using the disclosed mechanism to advertise all possible tunnels for client routes.

The SD-WAN NLRI and SAFI can also include information such as a WAN port's NAT information, SD-WAN site ID, SD-WAN edge node ID, and IPsec related information. The following includes further explanations of terms used herein. A cloud data center (DC) may be an off-premise data center that usually hosts applications and workloads owned by different organizations or tenants. The term controller may be used interchangeably with SD-WAN controller, and may be used to manage SDWAN overlay path creation/deletion and monitor the path conditions between sites. A CPE based virtual private network (VPN) is a virtual private secure network formed among CPEs. This may be a different usage from PE based VPNs. A SD-WAN endpoint is a WAN port (logical or physical) of a SD-WAN edge node. Endpoint, when used, may refer to an SD-WAN endpoint. The term OnPrem may refer to on premises data centers and branch offices. A SD-WAN refers to the solutions of pooling WAN bandwidth from multiple underlay networks to get better WAN bandwidth management, visibility, and control. When the underlay networks are private networks, traffic can be forwarded without additional encryption. When the underlay networks are public, such as in the Internet, some traffic should be encrypted when forwarding through those WAN ports (e.g., depending on user provided policies).

Figure 6:
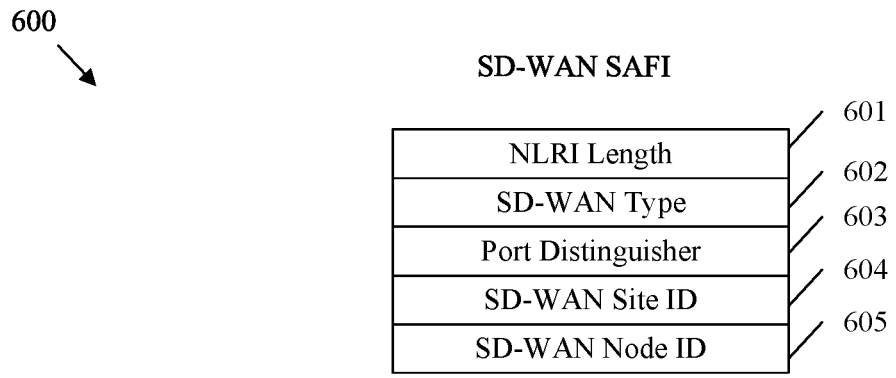
FIG. 6 is a schematic diagram of an example SD-WAN SAFI.

FIG. 6 is a schematic diagram of an example SD-WAN SAFI 600. For example, the SD-WAN SAFI 600 may be employed in a BGP update message to encode a SD-WAN edge node's SD-WAN port information. As such, the SD-WAN SAFI 600 may be employed by SD-WAN edge nodes in SD-WAN network 100 and/or 200 and/or a network node 500. Further, the SD-WAN SAFI 600 can be used in methods 300, 1000, 1100, and/or 1200. The SD-WAN SAFI 600 is used to encode NLRI of one or more SD-WAN ports for a SD-WAN edge node. In an example implementation, the SD-WAN SAFI 600 may include a SAFI code point of seventy four to advertise properties of SD-WAN ports that face untrusted networks. Depending on user policies, some packets sent through those SD-WAN ports may need encryption.

The SD-WAN SAFI 600 includes a NLRI length field 601, which may be a field with a length of one octet expressed in bits. The NLRI length field 601 indicates the length of the SD-WAN SAFI 600. The SD-WAN SAFI 600 also includes a SD-WAN type field 602, which may be a field with a length of two octets. The SD-WAN type field 602 is used to define the encoding of the rest of the SD-WAN NLRI. The SD-WAN type field 602 may include a route type that defines the encoding of the rest of the SD-WAN NLRI, and a set of sub-TLVs to specify end-point attributes and policies associated with the ports of an SD-WAN edge node. For example, the SD-WAN type field 602 may indicate the remainder of the SD-WAN SAFI 600 contains data related to SD-WAN ports, corresponding tunnels, and corresponding security data (and not sub-network address data).

The SD-WAN SAFI 600 also includes a port distinguisher field 603, which may be a field with a length of four octets. The port distinguisher field 603 may indicate a SD-WAN edge node port ID. A SD-WAN edge node may include many ports, and each port can have different properties. For example, some ports may have IP addresses (e.g., IP version four (IPv4) or IP version six (IPv6)) assigned by an internet service provider (ISP) and/or by Dynamic Host Configuration Protocol (DHCP). Some ports may have private IP addresses. In such cases, packets traversing those ports have to undergo network address translation (NAT). The detailed properties of the port may be further encoded in subsequent sub-TLVs, such as a port sub-TLV. In an example implementation, one SD-WAN edge node can have multiple ports, and each port can support multiple IPsec SAs to different peers. The port distinguisher field 603 can uniquely identify a port or link. The properties of the port can be encoded in sub-TLVs attached to the SD-WAN NLRI. Such sub-TLVs can also encode the IP address (IPv4 or IPv6) and autonomous system (AS) number of the port denoted in the port distinguisher field 603. Such sub-TLVs can also encode NAT information for ports with private IP addresses as denoted in the port distinguisher field 603. Such sub-TLVs can also encode IPsec security association related information if the port denoted in the port distinguisher field 603 is facing a public network and associated traffic through the port should be encrypted.

The SD-WAN SAFI 600 also includes a SD-WAN Site ID field 604, which may be a field with a length of four octets. The SD-WAN Site ID field 604 is used to identify a common property shared by a set of SD-WAN edge nodes, such as the property of a specific geographic location shared by a group of SD-WAN edge nodes. In a specific implementation, the SD-WAN Site ID field 604 is used to identify a common property shared by a set of SD-WAN edge nodes/ports, such as the property of a specific geographic location. The identified property can then be used to steer an overlay route to traverse specific geographic locations for various reasons, such as to comply regulatory rules, to utilize specific value added services, or others.

The SD-WAN SAFI 600 also includes a SD-WAN Node ID field 605, which may be a field with a length of four or sixteen octets. The SD-WAN Node ID field 605 contains data identifying a corresponding SD-WAN edge node. For example, the SD-WAN Node ID field 605 may contain a node's system ID or a loopback address (e.g., IPv4 or IPv6) of the SD-WAN edge node.

Figure 7:
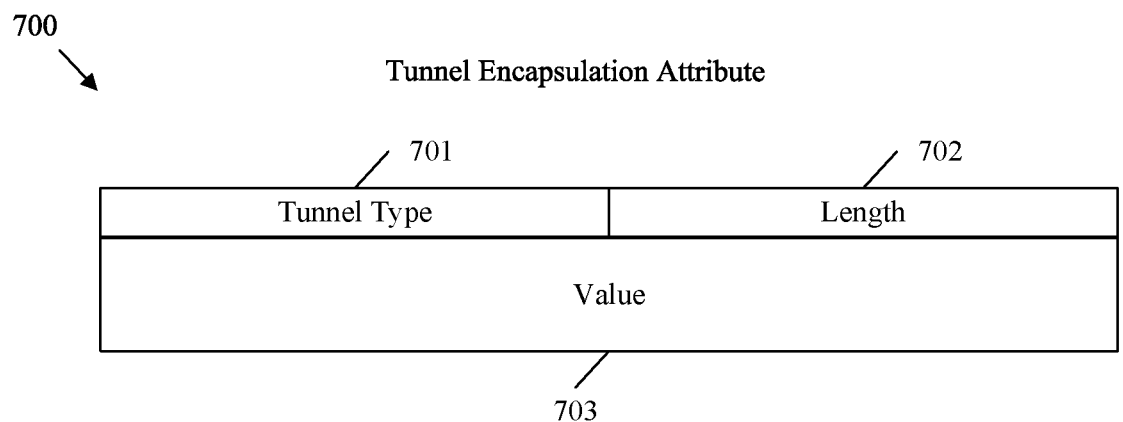
FIG. 7 is a schematic diagram of an example tunnel encapsulation attribute type length value (TLV).

FIG. 7 is a schematic diagram of an example tunnel encapsulation attribute TLV 700. For example, the tunnel encapsulation attribute TLV 700 may be employed in a BGP update message including a SD-WAN SAFI 600. In another example, the tunnel encapsulation attribute TLV 700 can be included in a BGP update message containing an IP SAFI and configured to carry SD-WAN port information/NLRI. As such, the tunnel encapsulation attribute TLV 700 may be employed by SD-WAN edge nodes in SD-WAN network 100 and/or 200 and/or a network node 500. Further, the tunnel encapsulation attribute TLV 700 can be used in methods 300, 400, 1000, 1100, and/or 1200.

The tunnel encapsulation attribute TLV 700 is used to encode SD-WAN port information/NLRI. The tunnel encapsulation attribute TLV 700 includes a tunnel type field 701, which may have a length of two octets. The tunnel type field 701 may indicate a tunnel type used by corresponding SD-WAN port(s). Hence, the tunnel type field 701 contains a SD-WAN port property. The tunnel encapsulation attribute TLV 700 also includes a length field 702, which may be two octets in length. The length field 702 may indicate the length of the tunnel encapsulation attribute TLV 700 along with corresponding sub-TLVs. The tunnel encapsulation attribute TLV 700 also includes a value field 703 of variable length. The content of SD-WAN Port properties can be encoded in a value field 703 of the tunnel encapsulation attribute TLV 700. For example, value field 703 may contain a SD-WAN SAFI, such as SD-WAN SAFI 600. In some examples, the SD-WAN SAFI in the value field 703 may contain a value of seventy four to indicate a SD-WAN SAFI. The value field 703 may also contain a NLRI including a SD-WAN-Type, a NLRI length, a port-distinguisher, a SD-WAN site ID, and/or one or more SD-WAN node IDs. The value field 703 may also carry various sub-TLVs, such as NAT sub-TLV(s), IPsec SA attribute Sub-TLV(s) (e.g., IPsec Sub-TLV 900), and/or a port sub-TLV(s) (e.g., SD-WAN port sub-TLV 800). The NAT sub-TLV is for describing additional information about the SD-WAN tunnel end-points, such as NAT properties. The IPsec SA sub-TLV includes information to allow a receiving node to establish an IPsec SA with a sending peer. The port sub-TLV is used for communicating additional properties of the SD-WAN port.

Figure 8:
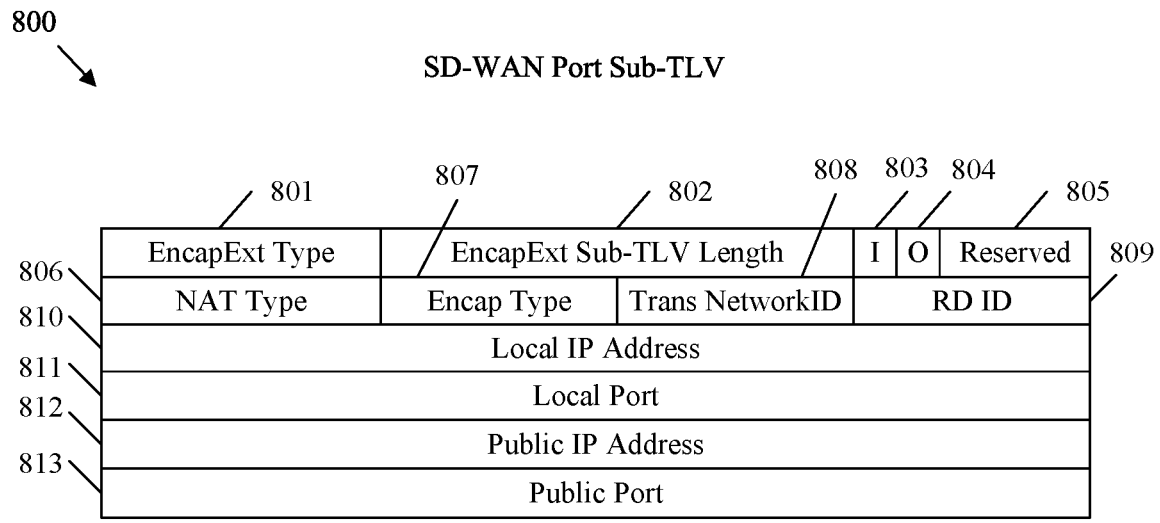
FIG. 8 is a schematic diagram of an example SD-WAN port sub-TLV.

FIG. 8 is a schematic diagram of an example SD-WAN port sub-TLV 800. For example, the SD-WAN port sub-TLV 800 may be employed in a BGP update message including a SD-WAN SAFI 600 and a tunnel encapsulation attribute TLV 700. In another example, the SD-WAN port sub-TLV 800 can be included in a BGP update message containing an IP SAFI and configured to carry SD-WAN port information/ NLRI. As such, the SD-WAN port sub-TLV 800 may be employed by SD-WAN edge nodes in SD-WAN network 100 and/or 200 and/or a network node 500. Further, the SD-WAN port sub-TLV 800 can be used in methods 300, 400, 1000, 1100, and/or 1200. The SD-WAN port sub-TLV 800, also denoted as an EncapExt sub-TLV, may be used for describing additional information about a SD-WAN port, such as a NAT property for a port that has a private address, a network identifier that the port is part of, etc. A SD-WAN edge node can communicate with a session traversal of User Datagram Protocol (UDP) through network address translation (STUN) server to obtain the NAT property, the public IP address, and the public port number to pass to peers.

The SD-WAN port sub-TLV 800 includes an encapsulation extension type field 801 with a length of eight bits (where eight bits is one octet). The encapsulation extension type field 801 is set to indicate that the data represents an EncapExt sub-TLV. The SD-WAN port sub-TLV 800 also includes an encapsulation extension sub-TLV length field 802 with a length of sixteen bits. The encapsulation extension sub-TLV length field 802 includes the length of the SD-WAN port sub-TLV 800. The SD-WAN port sub-TLV 800 also includes various flags including an I bit 803, an O bit 804, and reserved bits 805. The I bit 803 indicates the CPE/edge node port address and/or inner address scheme. The I bit 803 may be set to zero to indicate the inner/private address for the port is an IPv4 address. The I bit 803 may be set to one to indicate the inner/private address for the port is an IPv6 address. The O bit 804 indicates the CPE/edge node port outer address scheme. The O bit 804 may be set to zero to indicate the outer/public address for the port is an IPv4 address. The O bit 804 may be set to one to indicate the outer/public address for the port is an IPv6 address. The reserved bits 805 may include six bits that are reserved for other functions and may be set to zero.

The SD-WAN port sub-TLV 800 also includes a NAT type field 806 with a length of eight bits. The NAT type field 806 indicates the NAT type for address conversion between public addresses and private addresses associated with the SD-WAN edge node. The NAT type field 806 can indicate a NAT type of without NAT (no NAT), one to one static NAT, full cone NAT, restricted cone NAT, port restricted cone NAT, symmetric NAT, or unknown NAT (e.g., no response from STUN server). The SD-WAN port sub-TLV 800 also includes an encapsulation type field 807 with a length of eight bits. The encapsulation type field 807 can indicate the supported encapsulation types for the port facing public network, such as IPsec and generic routing encapsulation (GRE), IPsec and virtual extensible local area network (VxLAN), IPsec without GRE, GRE (when packets don't need encryption), etc. The SD-WAN port sub-TLV 800 also includes a transport network ID field 808 with a length of eight bits. The transport network ID field 808 indicates a globally unique ID indicating a corresponding transport network as assigned by the central controller. The SD-WAN port sub-TLV 800 also includes a routing domain ID field 809 with a length of eight bits. The routing domain ID field 809 indicates a globally unique ID that indicates a corresponding routing domain.

The SD-WAN port sub-TLV 800 also includes a local IP address field 810 with a length of thirty two bits for an IPv4 address or one hundred twenty eight bits for an IPv6 address. The local IP address field 810 contains the local/private IP address of a SD-WAN port of a SD-WAN edge node. The SD-WAN port sub-TLV 800 also includes a local port field 811 with a length of thirty two bits. The local port field 811 indicates a local port that a remote SD-WAN node can use when establishing an IPsec SA. The SD-WAN port sub-TLV 800 also includes a public IP address field 812 with a length of thirty two bits for an IPv4 address or one hundred twenty eight bits for an IPv6 address. The public IP address field 812 may contain the public IP address after application of the NAT. If NAT is not used, the public IP address field 812 may be set to NULL. The SD-WAN port sub-TLV 800 also includes a public port field 813 with a length of thirty two bits. The public port field 813 indicates the port identifier after application of the NAT. If NAT is not used, the public port field 813 may be set to NULL.

Figure 9:
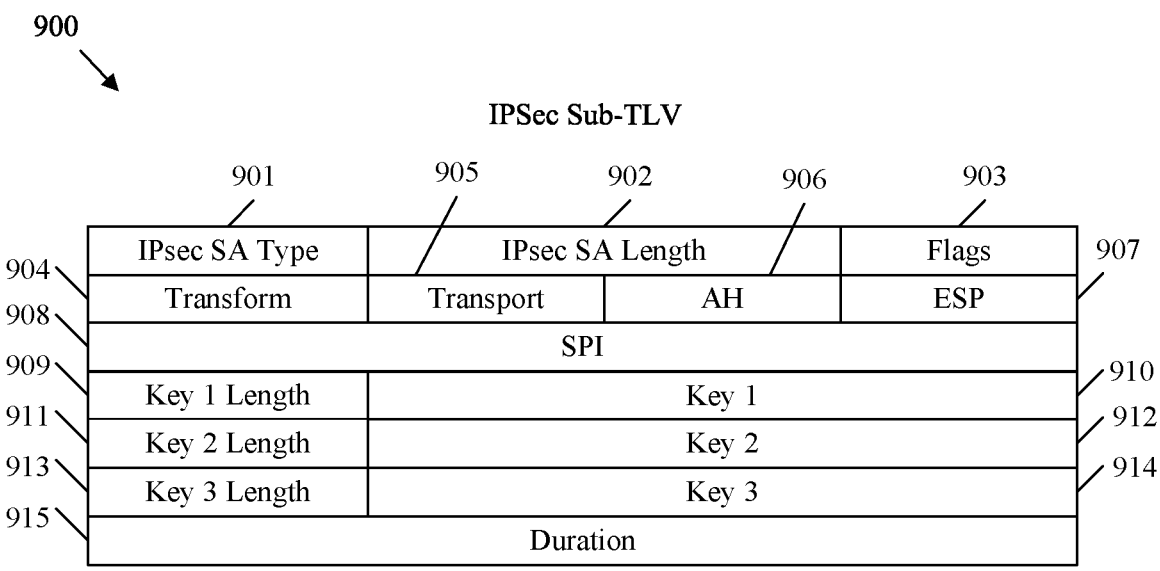
FIG. 9 is a schematic diagram of an example IP security (IPsec) sub-TLV.

FIG. 9 is a schematic diagram of an example IPsec sub-TLV 900. For example, the IPsec sub-TLV 900 may be employed in a BGP update message including a SD-WAN SAFI 600, a tunnel encapsulation attribute TLV 700, and/or a SD-WAN port sub-TLV 800. In another example, the IPsec sub-TLV 900 can be included in a BGP update message containing an IP SAFI and configured to carry SD-WAN port information/NLRI. As such, the IPsec sub-TLV 900 may be employed by SD-WAN edge nodes in SD-WAN network 100 and/or 200 and/or a network node 500. Further, the IPsec sub-TLV 900 can be used in methods 300, 400, 1000, 1100, and/or 1200. The IPsec sub-TLV 900 may be used by an SD-WAN edge node to support establishing IPsec security associations with peer nodes via a port that faces an untrusted network. For example, the IPsec sub-TLV 900 may contain information from a source peer node that is sufficient to allow a destination peer node to establish a security association with a specified port over an unsecure network, such as the Internet. As such, exchanging IPsec sub-TLVs 900 between peer nodes provides information sufficient to establish a security association to encrypt a corresponding bidirectional communication.

The IPsec sub-TLV 900 includes an IPsec SA type field 901 with a length of eight bits. The IPsec SA type field 901 indicates the type of IPsec security association that can be established with a corresponding port. The type value in the IPsec SA type field 901 should be between one hundred twenty eight and two hundred fifty five because the IPsec sub-TLV 900 supports a length value of two bytes (sixteen bits). The IPsec sub-TLV 900 also includes an IPsec SA length field 902 with a length of sixteen bits/two bytes. The IPsec SA length field 902 indicates the length of the IPsec sub-TLV 900. The IPsec sub-TLV 900 also includes various eight bits of flags 903, which may be reserved for other purposes, set to zero upon transmission, and ignored upon receipt in some examples.

The IPsec sub-TLV 900 includes a transform field 904 with a length of eight bits. The transform field 904 may contain a value indicating an authentication header (AH) protocol transform, an encapsulating security payload (ESP) protocol transform, or a combination AH and ESP transform. The IPsec sub-TLV 900 also includes a transport field 905 with a length of eight bits. The transport field 905 includes a value to indicate the port supports tunnel mode or transport mode when employing IPsec. The IPsec sub-TLV 900 also includes an AH field 906 with a length of eight bits. The AH field 906 indicates the AH authentication algorithms supported by the port. The AH field 906 can indicate message digest (md)5, secure hash algorithm (sha)1, sha2-256, sha2-384, sha2-512, and/or Chinese National Standard cryptographic hash function (sm3). An SD-WAN edge node may support multiple authentication algorithms. The AH field 906 may contain each of the supported authentication algorithms to allow peers to negotiate the strongest mutually available authentication algorithm. The IPsec sub-TLV 900 also includes an ESP field 907 with a length of eight bits. The ESP field 907 includes the ESP authentication algorithms supported by the port. The ESP field 907 can indicate md5, sha1, sha2-256, sha2-384, sha2-512, and/or sm3. The ESP field 907 may contain each of the supported authentication algorithms to allow peers to negotiate the strongest mutually available authentication algorithm. The default algorithm may be advanced encryption standard (AES)-256.

The IPsec sub-TLV 900 also includes a security parameter index (SPI) field 908 with a length of thirty two bits (four bytes). The SPI field 908 indicates the SPI of the SA to be used when processing received packets. The IPsec sub-TLV 900 also includes a key 1 field 910, a key 2 field 912, and a key 3 field 914 which contain an AH authentication key, an ESP authentication key, and an ESP encryption public key, respectively. The key 1 field 910, key 2 field 912, and key 3 field 914 may each be twenty four bits (three bytes) in length. The IPsec sub-TLV 900 also includes a key 1 length field 909, a key 2 length field 911, and a key 3 length field 913 which indicate the lengths of the AH authentication key, the ESP authentication key, and the ESP encryption public key, respectively. The key 1 length field 909, a key 2 length field 911, and a key 3 length field 913 may each be eight bits long. The IPsec sub-TLV 900 also includes a duration field 915 with a length of thirty two bits. The duration field 915 indicates the valid lifespan of the SA.

It should be noted that a remote endpoint sub-TLV may not be used for SD-WAN NLRI because the SD-WAN edge node ID and site ID are already encoded in the SD-WAN NLRI. Further, the network connected by the SD-WAN WAN port might have an identifier that is more than the AS number. Also, the SD-WAN controller might use its own specific identifier for the network. In the disclosed example, the Transport Network ID in the EncapExt sub-TLV may represent the SD-WAN unique network identifier. If the remote endpoint Sub-TLV is present, it may be ignored by other SD-WAN edge nodes.

The following is an example operation of an SD-WAN edge node. The processing steps to announce the SD-WAN combination of routes, NAT and IPsec information via BGP include advertising the SD-WAN port properties, such as port identifiers and supported properties etc. to an RR (local controller) via the SD-WAN SAFI NLRI. The RR/local controller then propagates the information to peer nodes (e.g., a CPE2 and a CPE 3). The peer nodes (e.g., CPE2 and CPE3) can choose to establish IPsec SA with the SD-WAN edge node (e.g., CPE1) after receiving the CPE1 WAN properties from the RR. It should also be noted that tenant separation can be achieved by peer group policies on the RR.

Figure 10:
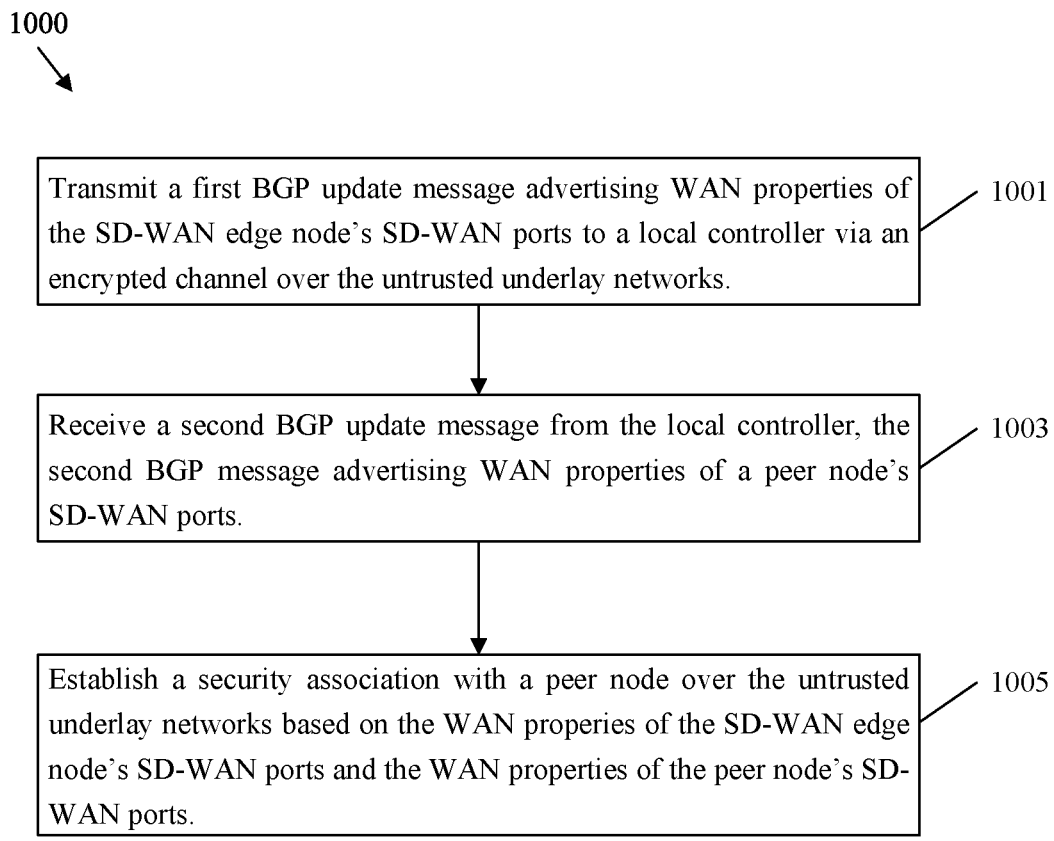
FIG. 10 is a flowchart of an example method of BGP based distribution of SD-WAN port Network Layer Reachability Information (NLRI) by a SD-WAN edge node.

FIG. 10 is a flowchart of an example method 1000 of BGP based distribution of SD-WAN port WAN properties by a SD-WAN edge node. Method 1000 may be employed by SD-WAN edge nodes in SD-WAN network 100 and/or 200 and/or a network node 500. Further method 1000 may be employed to implement methods 300 and/or 400. The method 1000 may employ a SD-WAN SAFI 600, a tunnel encapsulation attribute TLV 700, a SD-WAN port sub-TLV 800, and/or an IPsec sub-TLV 900 to communicate SD-WAN port information.

The method 1000 may be implemented on an SD-WAN edge node. The SD-WAN edge node may include a CPE, a VM, or any other device acting as a peer node for purposes of establishing a SD-WAN overlay. The SD-WAN edge node operating method 1000 may comprise one or more SD-WAN ports configured to couple to one or more untrusted underlay networks. An underlay network may be any physical network capable of communicating data. The method 1000 may be initiated when the SD-WAN edge node powers on and after the SD-WAN edge node has established a secure connected to a local controller. The SD-WAN edge node may also operate the method 1000 by employing a transmitter, receiver, a transceiver, a processor, a memory, a cache, etc.

At step 1001, the SD-WAN edge node transmits a first BGP update message advertising WAN properties of the SD-WAN edge node's SD-WAN ports to a local controller via an encrypted, and therefore secure, channel over the untrusted underlay networks. The WAN properties of the SD-WAN edge node's SD-WAN ports describes SD-WAN port capabilities and tunnel end-point attributes. For example, the WAN properties of the SD-WAN edge node's SD-WAN ports may comprise a tunnel end point, a private port address, a port IPsec capability, a SD-WAN routing policy, tunnel encryption data, or combinations thereof. In some cases, the WAN properties can be encoded in a NLRI field in the first BGP update message. Accordingly, the WAN properties may act as NLRI for the SD-WAN edge node. In some cases, the WAN properties of the SD-WAN edge node's SD-WAN ports is included in a SAFI specific to SD-WAN ports, such as a SD-WAN SAFI 600. In such a case, the SAFI may contain a NLRI length, a SD-WAN type, a port distinguisher, a SD-WAN site ID, and a SD-WAN node ID. In some examples, the WAN properties of the SD-WAN edge node's SD-WAN ports may be included in a SD-WAN tunnel encapsulation attribute. The SD-WAN tunnel encapsulation attribute may include a tunnel type, an IPsec security association (SA) attribute, and an encapsulation extension TLV. Regardless of the example, the WAN properties of the SD-WAN edge node's SD-WAN ports is forwarded to a peer node via the local controller (also referred to as a route reflector in some contexts).

At step 1003, the SD-WAN edge node receives a second BGP update message from the local controller. The second BGP update message advertises the WAN properties of a peer node's SD-WAN ports. The second BGP update message of step 1003 may be substantially similar to the first BGP update message of step 1001, except the second BGP update message contains WAN properties related to the peer nodes ports. Accordingly, the second BGP update message may contain similar formatting and/or information types as described with respect to the first BGP update message.

At step 1005, the SD-WAN edge node can establish a security association with a peer node over the untrusted underlay networks based on the WAN properties of the SD-WAN edge node's SD-WAN ports and the WAN properties of the peer node's SD-WAN ports. For example, a processor at the SD-WAN edge node may receive the WAN properties of the peer node's SD-WAN ports from a receiver and receive computer instructions which, when executed, prompt the SD-WAN edge node to establish the security association. The SD-WAN edge node can then communicate with the SD-WAN via the security association.

Figure 11:
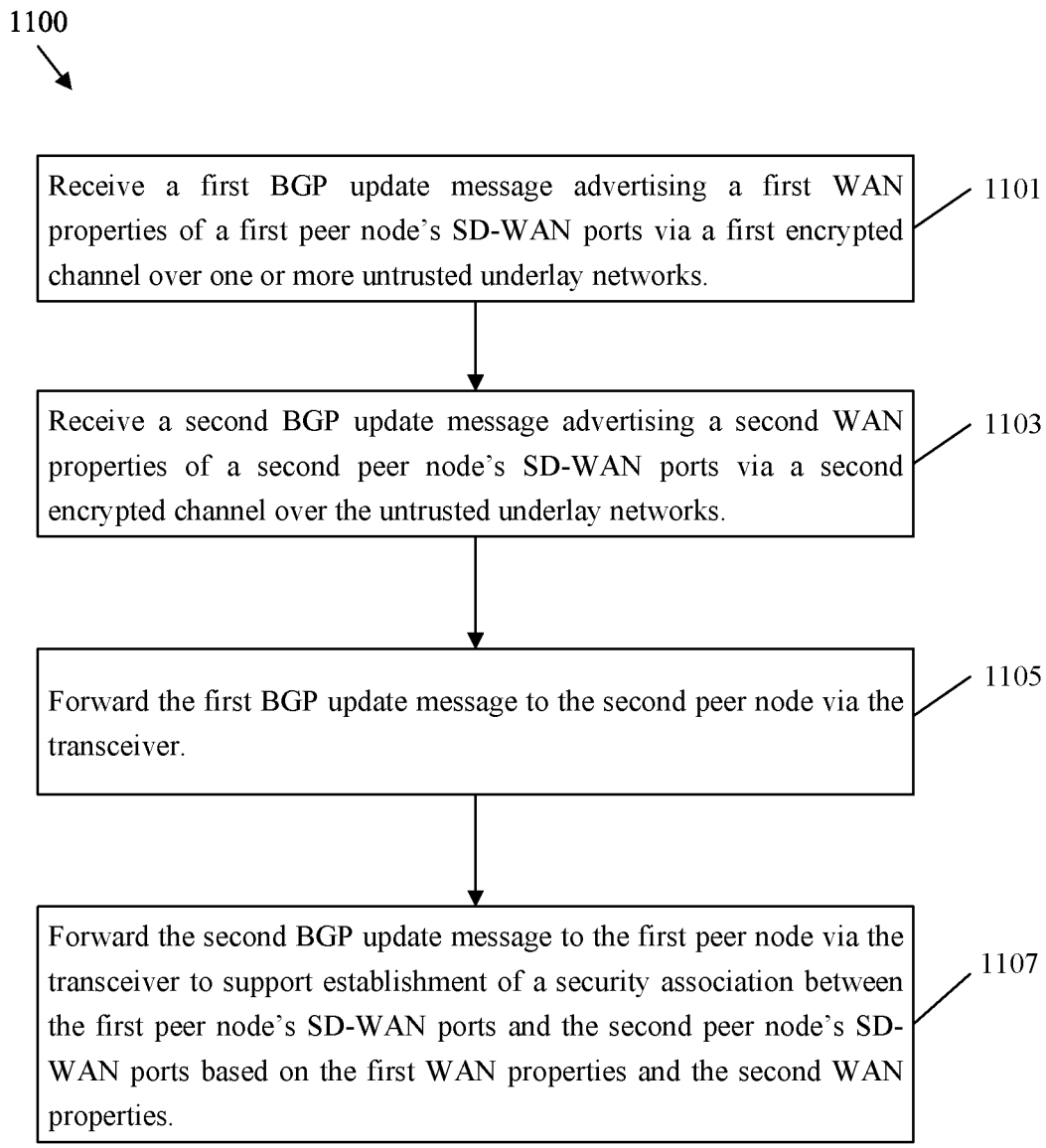
FIG. 11 is a flowchart of an example method of BGP based distribution of SD-WAN port NLRI by a local controller.

FIG. 11 is a flowchart of an example method 1100 of BGP based distribution of SD-WAN port WAN properties by a local controller. Method 1100 may be employed by a local controller/route reflector in SD-WAN network 100 and/or 200 and/or a network node 500. Further method 1100 may be employed to implement methods 300 and/or 400. The method 1100 may employ a SD-WAN SAFI 600, a tunnel encapsulation attribute TLV 700, a SD-WAN port sub-TLV 800, and/or an IPsec sub-TLV 900 to communicate SD-WAN port information.

The method 1100 may be implemented on a local controller. The local controller may be assigned, by a central controller, to manage routing across a SD-WAN overlay between SD-WAN edge nodes, such as a CPE, a VM, or any other device acting as a peer node in an SD-WAN network. The local controller operating method 1100 may comprise one or more ports configured to couple to one or more untrusted underlay networks. The local controller may establish secure connections with the peer nodes over such ports. The method 1100 may be similar to method 1000, but may be described from the perspective of the local controller. The method 1100 may be initiated after an encrypted connection has been established between the local controller and a plurality of SD-WAN edge nodes that are peers and hence act as peer nodes. The local controller may also operate the method 1100 by employing a transmitter, receiver, a transceiver, a processor, a memory, a cache, etc.

At step 1101, the local controller receives a first BGP update message advertising first WAN properties of a first peer node's SD-WAN ports via a first secure channel over one or more untrusted underlay networks. The first BGP update message may be substantially similar to the first BPG message or the second BGP update message of method 1000. For example, the first WAN properties may describe SD-WAN port capabilities and tunnel end-point attributes of the first peer node's SD-WAN ports. Further, the first WAN properties may comprise a tunnel end point, a private port address, a port IPsec capability, a SD-WAN routing policy, tunnel encryption data, or combinations thereof. In some examples, the WAN properties may be included in an NLRI field in a BGP update message, and hence may act as NLRI for the corresponding node. In some examples, the first WAN properties are included in a SAFI specific to SD-WAN ports, such as a SD-WAN SAFI 600. The SAFI may contain a NLRI length, a SD-WAN type, a port distinguisher, a SD-WAN site ID, and a SD-WAN node ID. The first WAN properties may be included in a SD-WAN tunnel encapsulation attribute. Further, the SD-WAN tunnel encapsulation attribute may include a tunnel type, an IPsec SA attribute, and an encapsulation extension TLV.

At step 1103, the local controller receives a second BGP update message advertising a second WAN properties of a second peer node's SD-WAN ports via a second secure channel over the untrusted underlay networks. The second BGP update message of step 1103 may be substantially similar to the first BGP update message of step 1101, except the second BGP update message contains WAN properties related to the second peer node's ports instead of the first peer node's ports. Accordingly, the second BGP update message may contain similar formatting and/or information types as described with respect to the first BGP update message.

The first BGP update message and the second BGP update message are processed. For example, a processor may receive the first BGP update message and the second BGP update message from a transceiver and receive computer instructions which, when executed, prompt the local controller to perform steps 1105 and 1107. Specifically, at step 1105 the local controller forwards the first BGP update message to the second peer node via a transceiver and over the secure channel. Further, at step 1107, the local controller forwards the second BGP message to the first peer node via the transceiver/secure channel to support establishment of a security association between the first peer node's SD-WAN ports and the second peer node's SD-WAN ports based on the first WAN properties and the second WAN properties.

Figure 12:
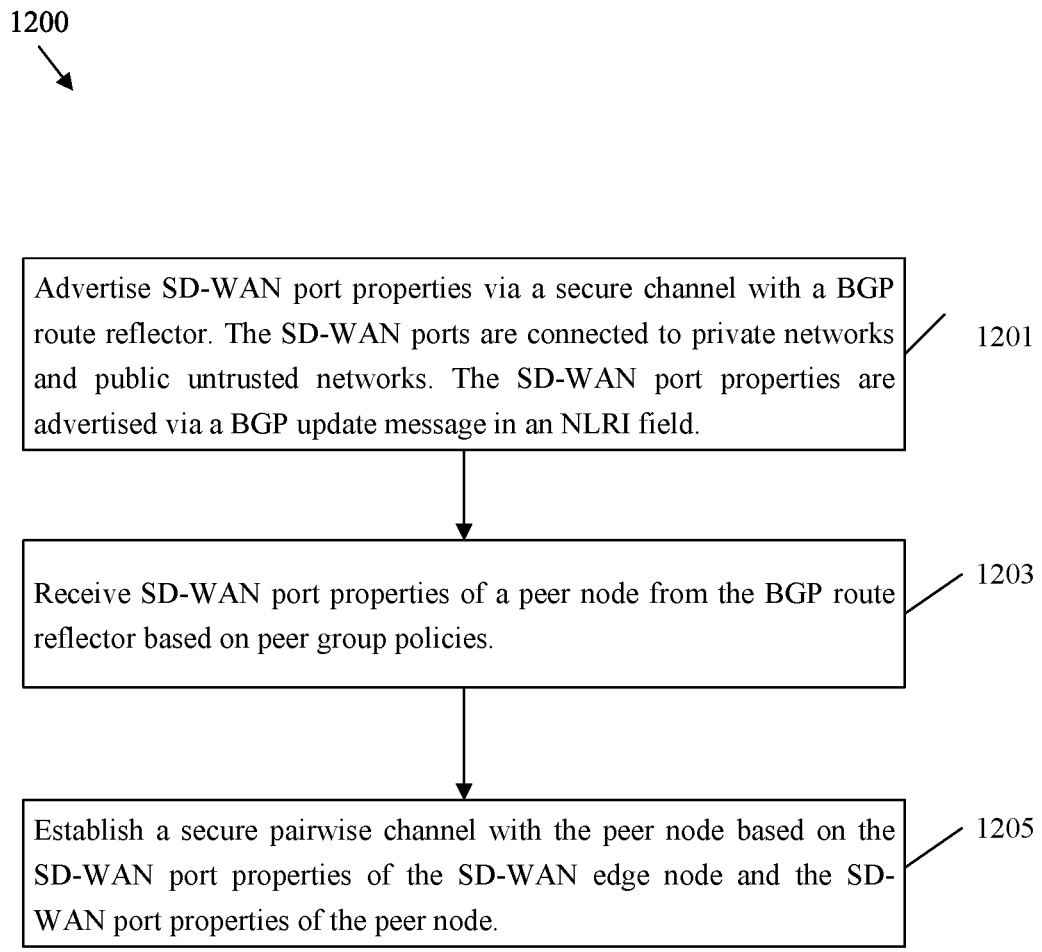
FIG. 12 is a flowchart of another example method of BGP based distribution of SD-WAN port NLRI by a SD-WAN edge node.

FIG. 12 is a flowchart of another example method 1200 of BGP based distribution of SD-WAN port WAN properties by a SD-WAN edge node. Method 1200 may be employed by SD-WAN edge nodes in SD-WAN network 100 and/or 200 and/or a network node 500. Further method 1200 may be employed to implement methods 300 and/or 400. The method 1200 may employ a SD-WAN SAFI 600, a tunnel encapsulation attribute TLV 700, a SD-WAN port sub-TLV 800, and/or an IPsec sub-TLV 900 to communicate SD-WAN port information.

The method 1200 may be implemented on an SD-WAN edge node. The SD-WAN edge node may include a CPE, a VM, or any other device acting as a peer node for purposes of establishing a SD-WAN overlay. The SD-WAN edge node operating method 1200 may comprise one or more SD-WAN ports configured to couple to one or more untrusted underlay networks. The method 1200 may be initiated when the SD-WAN edge node powers on and after the SD-WAN edge node has established a secure connected to a local controller. The SD-WAN edge node may also operate the method 1200 by employing a transmitter, receiver, a transceiver, a processor, a memory, a cache, etc.

At step 1201, the SD-WAN edge node advertises SD-WAN port properties via a secure channel with a BGP route reflector, such as a local controller. The SD-WAN ports may be connected to private networks and public untrusted networks. Further, the SD-WAN port properties may be advertised via a BGP based SD-WAN WAN properties, for example in an NLRI field of a BGP update message. The SD-WAN WAN properties can be described by a SD-WAN SAFI for advertising properties of SD-WAN ports that face untrusted networks. Further, the SD-WAN SAFI may include a NLRI length field indicating a length of the SD-WAN NLRI, a SD-WAN type field defining an encoding of the SD-WAN WAN properties, a port distinguisher including a SD-WAN edge node port ID, a SD-WAN site ID identifying a common property shared by a set of SD-WAN edge nodes, and a SD-WAN node ID identifying the SD-WAN edge node. The port distinguisher may uniquely identify a corresponding SD-WAN port. The port distinguisher may include an IP address of the corresponding SD-WAN port, NAT information for a private IP address, and IPsec security association related information for the corresponding SD-WAN port. The common property indicated in the SD-WAN site ID can be used to steer an overlay route to traverse specific geographic regions for policy reasons. Further, the SD-WAN WAN properties can be described by a tunnel encapsulation attribute including a tunnel type indicating a SD-WAN port property, a NAT sub-TLV describing information regarding SD-WAN tunnel end points, an IPsec SA attribute sub-TLV including information for establishing IPsec SAs with the peer node, and a port sub-TLV including additional properties of the corresponding SD-WAN port.

At step 1203, the SD-WAN edge node may receive SD-WAN port properties of a peer node from the BGP route reflector based on peer group policies, for example via a BGP update message that is substantially similar to the BGP update message of step 1201, but contains the SD-WAN WAN properties of the peer node. At step 1205, the SD-WAN edge node can establish a secure pairwise channel with the peer node based on the SD-WAN port properties of the SD-WAN edge node and the SD-WAN port properties of the peer node. Such a secure pairwise channel can then be employed to communicate across the SD-WAN.

Figure 13:
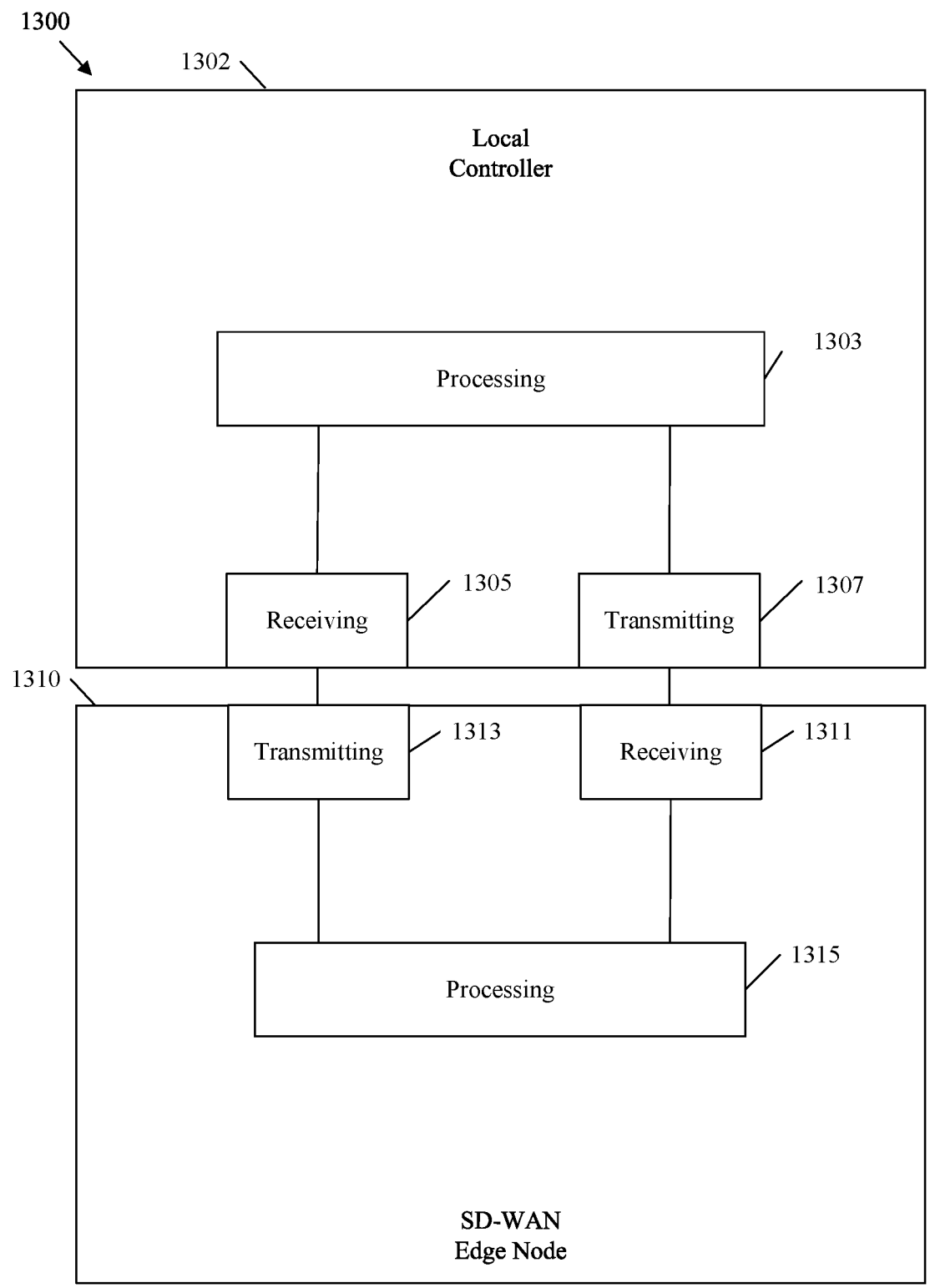
FIG. 13 is a schematic diagram of an example system for BGP based distribution of SD-WAN port NLRI.

FIG. 13 is a schematic diagram of an example system 1300 for BGP based distribution of SD-WAN port WAN properties. System 1300 may be implemented by corresponding nodes in a SD-WAN network 100 and/or 200 and/or a network node 500. Further method system 1300 may be employed to implement methods 300, 400, 1000, 1100, and/or 1200. The system 1300 may employ a SD-WAN SAFI 600, a tunnel encapsulation attribute TLV 700, a SD-WAN port sub-TLV 800, and/or an IPsec sub-TLV 900 to communicate SD-WAN port information.

The system 1300 includes a local controller 1302. The local controller 1302 comprises a receiving module 1305 for receiving a first BGP update message advertising first WAN properties of a first peer node's SD-WAN ports via a first secure channel over one or more untrusted underlay networks, and for receiving a second BGP update message advertising second WAN properties of a second peer node's SD-WAN ports via a second secure channel over the untrusted underlay networks. The local controller 1302 further comprises a processing module 1303 for processing the first BGP update message and the second BGP update message. The local controller 1302 further comprises a transmitting module 1307 for forwarding the first BGP update message to the second peer node, and forwarding the second BGP update message to the first peer node to support establishment of a security association between the first peer node's SD-WAN ports and the second peer node's SD-WAN ports based on the first WAN properties and the second WAN properties. The local controller 1302 may be further configured to perform any of the steps of method 1100.

The system 1300 also includes a SD-WAN edge node 1310. The SD-WAN edge node 1310 comprises a transmitting module 1313 for transmitting a first BGP update message advertising WAN properties of SD-WAN ports of the SD-WAN edge node to a local controller via a secure channel over untrusted underlay networks. The SD-WAN edge node 1310 further comprises a receiving module 1311 for receiving a second BGP update message from the local controller, the second BGP update message advertising WAN properties of a peer node's SD-WAN ports. The SD-WAN edge node 1310 further comprises a processing module 1315 for establishing a security association with a peer node over the untrusted underlay networks based on the WAN properties of the SD-WAN edge node's SD-WAN ports and the WAN properties of the peer node's SD-WAN ports. The SD-WAN edge node 1310 may be further configured to perform any of the steps of methods 1000 and/or 1200.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A Software Defined Wide Area Network (SD-WAN) edge node comprising:
   one or more edge node SD-WAN ports configured to couple to one or more untrusted underlay networks and one or more trusted underlay networks;
   a transmitter;
   a receiver;
   a non-transitory memory comprising computer executable instructions; and
   a processor coupled to the transmitter, the receiver, and the memory, wherein the computer executable instructions, when executed by the processor, cause the SD-WAN edge node to:
   transmit a first Border Gateway Protocol (BGP) update message advertising wide area network (WAN) properties of the edge node SD-WAN ports to a local controller via an encrypted channel over the untrusted underlay networks;
   receive a second BGP update message from the local controller, the second BGP update message advertising WAN properties of peer node SD-WAN ports of a peer node;
   and
   establish a security association with the peer node or the peer node SD-WAN ports of the peer node over the untrusted underlay networks based on the WAN properties of the edge node SD-WAN ports and the WAN properties of the peer node SD-WAN ports.

2. The SD-WAN edge node of claim 1, wherein the WAN properties of the edge node SD-WAN ports describes SD-WAN port capabilities and tunnel end-point attributes, and wherein the WAN properties of the edge node SD-WAN ports are encoded in a Network Layer Reachability Information (NLRI) field of the first BGP update message.

3. The SD-WAN edge node of claim 1, wherein the WAN properties of the edge node SD-WAN ports comprises a tunnel end point, a private port address, a port internet protocol security (IPsec) capability, a SD-WAN routing policy, tunnel encryption data, or combinations thereof.

4. The SD-WAN edge node of claim 1, wherein the WAN properties of the edge node SD-WAN ports is included in an overlay Subsequent Address Family Identifier (SAFI) specific overlay networks.

5. The SD-WAN edge node of claim 4, wherein the overlay SAFI contains a NLRI length, a SD-WAN type, a port distinguisher, a SD-WAN site identifier (ID), and a SD-WAN node ID.

6. The SD-WAN edge node of claim 1, wherein the WAN properties of the edge node SD-WAN ports are included in a SD-WAN tunnel encapsulation attribute.

7. The SD-WAN edge node of claim 6, wherein the SD-WAN tunnel encapsulation attribute includes a tunnel type, an internet protocol security (IPsec) security association (SA) attribute, and an encapsulation extension type length value (TLV).

8. A local controller comprising:
a transceiver;
a non-transitory memory comprising computer executable instructions;
a processor coupled to the transceiver and the non-transitory memory, wherein the computer executable instructions, when executed by the processor cause the local controller to:
receive a first Border Gateway Protocol (BGP) update message advertising first wide area network (WAN) properties of first peer node Software Defined Wide Area Network (SD-WAN) ports of a first peer node via a first encrypted channel over one or more untrusted underlay networks, the first BGP update message received via the transceiver;
receive a second BGP update message advertising second wide area network (WAN) properties of second peer node SD-WAN ports of a second peer node via a second encrypted channel over the untrusted underlay networks, the second BGP update message received via the transceiver;
forward the first BGP update message to the second peer node via the transceiver; and
forward the second BGP update message to the first peer node via the transceiver to support establishment of a security association between the first peer node SD-WAN ports and the second peer node SD-WAN ports based on the first WAN properties and the second WAN properties.

9. The local controller of claim 8, wherein the first WAN properties describes SD-WAN port capabilities and tunnel end-point attributes of the first peer node SD-WAN ports, and wherein the WAN properties of the first peer node SD-WAN ports are encoded in a Network Layer Reachability Information (NLRI) field of the first BGP update message.

10. The local controller of claim 8, wherein the first WAN properties comprises a tunnel end point, a private port address, a port internet protocol security (IPsec) capability, a SD-WAN routing policy, tunnel encryption data, or combinations thereof.

11. The local controller of claim 8, wherein the first WAN properties are included in an overlay Subsequent Address Family Identifier (SAFI) specific to overlay networks.

12. The local controller of claim 11, wherein the overlay SAFI contains a NLRI length, a SD-WAN type, a port distinguisher, a SD-WAN site identifier (ID), and a SD-WAN node ID.

13. The local controller of claim 8, wherein the first WAN properties are included in a SD-WAN tunnel encapsulation attribute.

14. The local controller of claim 13, wherein the SD-WAN tunnel encapsulation attribute includes a tunnel type, an internet protocol security (IPsec) security association (SA) attribute, and an encapsulation extension type length value (TLV).

15. A method implemented in a Software Defined Wide Area Network (SD-WAN) edge node, the method comprising:
advertising, by the SD-WAN edge node, SD-WAN port properties via a secure channel with a Border Gateway Protocol (BGP) route reflector, wherein SD-WAN ports are connected to private networks and public untrusted networks, and wherein the SD-WAN port properties are advertised via a BGP update message Network Layer Reachability Information (NLRI) field;
receiving, by the SD-WAN edge node, SD-WAN port properties of a peer node from the BGP route reflector based on peer group policies; and
establishing, by the SD-WAN edge node, a secure pairwise channel with the peer node based on the SD-WAN port properties of the SD-WAN edge node and the SD-WAN port properties of the peer node.

16. The method of claim 15, wherein the NLRI field is included in a SD-WAN subsequent address family identifier (SAFI) for advertising properties of SD-WAN ports that face untrusted networks.

17. The method of claim 16, wherein the SD-WAN SAFI includes a NLRI length field indicating a length of the NLRI, a SD-WAN type field defining an encoding of the NLRI field, a port distinguisher including a SD-WAN edge node port identifier (ID), a SD-WAN site ID identifying a common property shared by a set of SD-WAN edge nodes, and a SD-WAN node ID identifying the SD-WAN edge node.

18. The method of claim 17, wherein the port distinguisher uniquely identifies a corresponding SD-WAN port, and wherein the port distinguisher includes an internet protocol (IP) address of the corresponding SD-WAN port, network address translation (NAT) information for a private IP address, and IP security (IPsec) security association related information for the corresponding SD-WAN port.

19. The method of claim 17, wherein the common property indicated in the SD-WAN site ID is used to steer an overlay route to traverse specific geographic regions for policy reasons.

20. The method of claim 15, wherein the NLRI is described by a tunnel encapsulation attribute including a tunnel type indicating a SD-WAN port property, a network address translation (NAT) sub-type length value (TLV) describing information regarding SD-WAN tunnel end points, an IP security (IPsec) security association (SA) attribute sub-TLV including information for establishing IPsec SAs with the peer node, and a port sub-TLV including additional properties of a corresponding SD-WAN port.

* * * * *